(12) United States Patent
Oyman

(10) Patent No.: US 12,113,843 B2
(45) Date of Patent: Oct. 8, 2024

(54) VIEWPORT INDICATION DURING STREAMING OF VOLUMETRIC POINT CLOUD CONTENT

(71) Applicant: Intel Corporation, Santa Clara, CA (US)

(72) Inventor: Ozgur Oyman, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 16/912,491

(22) Filed: Jun. 25, 2020

(65) Prior Publication Data

US 2020/0329088 A1    Oct. 15, 2020

Related U.S. Application Data

(60) Provisional application No. 62/879,302, filed on Jul. 26, 2019.

(51) Int. Cl.
| | | |
|---|---|---|
| *H04L 65/70* | (2022.01) | |
| *H04L 65/1016* | (2022.01) | |
| *H04L 65/65* | (2022.01) | |
| *H04L 65/80* | (2022.01) | |
| *H04N 19/167* | (2014.01) | |
| *H04N 19/597* | (2014.01) | |

(52) U.S. Cl.
CPC .......... *H04L 65/70* (2022.05); *H04L 65/1016* (2013.01); *H04L 65/65* (2022.05); *H04L 65/80* (2013.01); *H04N 19/167* (2014.11); *H04N 19/597* (2014.11)

(58) Field of Classification Search
CPC ..... H04L 65/70; H04L 65/1016; H04L 65/65; H04L 65/80; H04L 65/613; H04N 19/167; H04N 19/597; G06T 9/001
See application file for complete search history.

(56) References Cited

U.S. PATENT DOCUMENTS

| | | | | |
|---|---|---|---|---|
| 9,386,275 | B2 * | 7/2016 | Oyman | .................... H04N 7/15 |
| 9,516,220 | B2 * | 12/2016 | Oyman | .................... H04N 7/15 |
| 10,021,346 | B2 * | 7/2018 | Oyman | ................ H04N 19/167 |
| 11,122,102 | B2 * | 9/2021 | Oh | .......................... G06T 17/10 |
| 11,200,700 | B2 * | 12/2021 | Wang | ........................ G06T 9/00 |
| 11,218,715 | B2 * | 1/2022 | Wang | ...................... G06T 15/00 |

(Continued)

OTHER PUBLICATIONS

3GPP, "Technical Specification Group Services and System Aspects; IP Multimedia Subsystem (IMS); Multimedia Telephony; Media handling and interaction (Release 16)," 3GPP TS 26.114 V16.2.0 (Jun. 2019), 5G, 414 pages.

*Primary Examiner* — Michael A Keller
(74) *Attorney, Agent, or Firm* — Schwabe, Williamson & Wyatt, P.C.

(57) ABSTRACT

Embodiments herein provide mechanisms for a receiving device to indicate to a transmitting device viewport information to indicate a region of interest for point cloud video content. For example, the receiving device may transmit a real-time transport control protocol (RTCP) feedback message that includes the viewport information. The viewport information includes an indication of a reference point for the region of interest. The receiving device may receive, from the transmitting device, the point cloud video for the region of interest based on the viewport information. Other embodiments may be described and claimed.

23 Claims, 10 Drawing Sheets

(56) References Cited

U.S. PATENT DOCUMENTS

| | | | |
|---|---|---|---|
| 11,233,716 B2* | 1/2022 | Hokanson | H04L 43/50 |
| 2010/0082834 A1* | 4/2010 | Joung | H04N 21/2383 |
| | | | 709/234 |
| 2021/0021664 A1* | 1/2021 | Oyman | H04N 19/597 |

* cited by examiner

VIEWPORT INDICATION DURING STREAMING OF VOLUMETRIC POINT CLOUD CONTENT

CROSS REFERENCE TO RELATED APPLICATION

The present application claims priority to U.S. Provisional Patent Application No. 62/879,302, titled "VIEWPORT INDICATION DURING STREAMING OF VOLUMETRIC POINT CLOUD CONTENT," which was filed Jul. 26, 2019, the disclosure of which is hereby incorporated by reference.

FIELD

Embodiments relate generally to the technical field of wireless communications and multimedia telephony service for Internet Protocol (IP) multimedia subsystem (IMS) (MTSI) technologies.

BACKGROUND

MTSI supports conversational speech, video, and text transported over real-time transport protocol (RTP) to deliver a user experience equivalent to or better than that of circuit switched conversational services using the same amount of network resources. MTSI defines media handling (e.g., signaling, transport, jitter buffer management, packet-loss handling, and adaptation), as well as interactivity (e.g., adding or dropping media during a call). The focus is to ensure a reliable and interoperable service with a predictable media quality, while allowing for flexibility in the service offerings. MTSI uses session initiation protocol (SIP), session description protocol (SDP), and SDP capabilities negotiation protocols for media negotiation and configuration. MTSI also uses RTP and real-time transport control protocol (RTCP) protocols for conveying conversational media components. For example, Real-time user plane media data is sent over RTP/user datagram protocol (UDP)/IP, while non-real-time media may use other transport protocols, for example UDP/IP or transmission communication protocol (TCP)/IP.

Volumetric content distribution is gaining traction to deliver 6 degrees of freedom (6DoF) immersive media experiences. The 6DoF immersive media content may be delivered using real-time protocols such as RTP as part of interactive real-time applications, such as live streaming and/or conversational services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
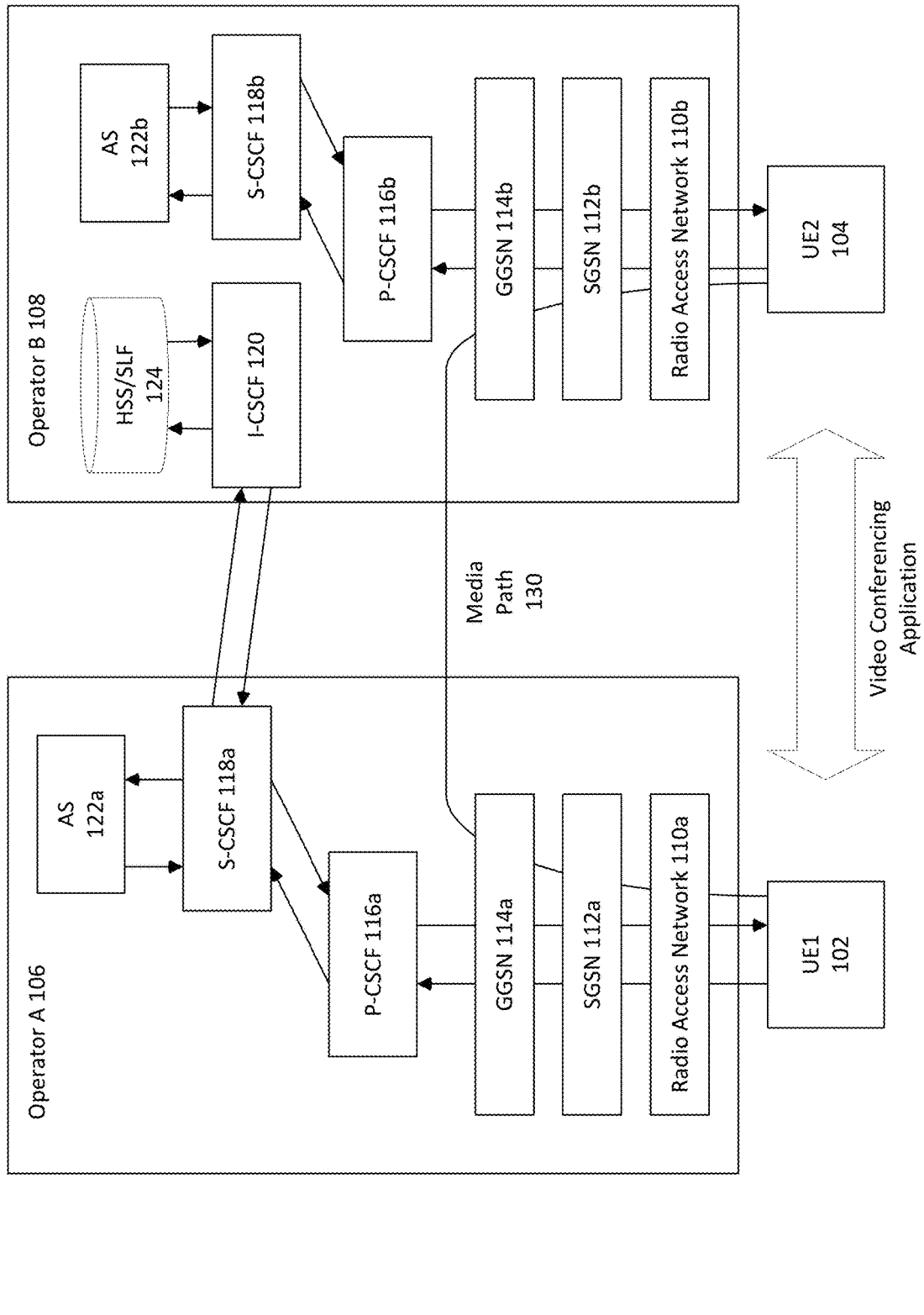
FIG. 1 illustrates an example video conferencing environment in accordance with various embodiments.

Embodiments herein provide mechanisms for a receiving device (e.g., a first user equipment (UE)) to indicate to a transmitting device (e.g., a second UE) viewport information to indicate a region of interest for point cloud video content. For example, the receiving device may transmit a RTCP feedback message that includes the viewport information. The viewport information includes an indication of a reference point for the region of interest. The receiving device may receive, from the transmitting device, the point cloud video for the region of interest based on the viewport information.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

Volumetric content distribution is gaining traction to deliver 6DoF immersive media experiences. The 6DoF immersive media content may be delivered using real-time protocols such as RTP as part of interactive real-time applications, such as live streaming and/or conversational services. Viewport indication during streaming of volumetric content is essential in order to optimize bandwidth utilization and quality of user experience. Various embodiments herein provide new RTP/RTCP-based procedures to support viewport indication during streaming of volumetric video content.

Initial virtual reality (VR) 360 degree support was limited to 3 degrees of freedom (3DoF), which means that the viewing position is only alterable through rotations on the x, y and z axes, represented as roll, pitch and yaw respectively, and purely translational movement does not result in different media being rendered. As such, VR360 delivered an overall flat experience since it positions the viewer in a static location with limited freedom of movement and low levels of interactivity. This was a limitation in the sense that fully immersive experiences were not possible thereby hurting the user experience and sense of realism. Emerging VR standards and products will provide support for 3DoF+ and 6DoF enhancing the level of immersion and user experience. While 3DoF+ restricts modifications of the viewing position by limiting translational movements of the user's head around the original viewpoint, 6DoF supports both rotational and translational movements allowing the user to change not only orientation but also position to move around in the observed scene. As part of its "Coded Representation of Immersive Media" (MPEG-I) project, MPEG is currently developing the codecs, storage and distribution formats, and rendering metadata necessary for delivering interoperable and standards-based immersive 3DoF+ and 6DoF experiences.

Volumetric video has been recently gaining significant traction in delivering 6DoF experiences. Volumetric video contains spatial data and enables viewers to walk around and interact with people and objects, and hence it is far more immersive than 360 video footage because it captures the movements of real people in three dimensions. Users may view these movements from any angle by using positional tracking. Point clouds are a volumetric representation for describing 3D objects and/or scenes. A point cloud comprises a set of unordered data points in a 3D space, each of which is specified by its spatial (x, y, z) position possibly along with other associated attributes, e.g., red-green-blue (RGB) color, surface normal, and/or reflectance. These data points may be the 3D equivalent of pixels for representing 2D videos. These data points collectively describe the 3D geometry and texture of the scene or object. Such a volumetric representation lends itself to immersive forms of interaction and presentation with 6DoF.

Accordingly, the following provide some aspects of point cloud content in accordance with various embodiments herein:

Point cloud is a form of representing 3D environments.
A point cloud is a set of points {v}, each point v having
   a spatial position (x, y, z) comprising the geometry and
   a vector of attributes such as colors (Y, U, V), normals,
   curvature or others.

A point cloud may be voxelized by quantizing the point
   positions to lie on an integer grid within a bounding
   cube. This allows for more efficient and/or real-time
   processing.
A cube of voxels in 3D are somewhat equivalent of pixels
   in 2D.
A voxel is said to be occupied if it contains any point of
   the point cloud.
Higher level representation that color and depth maps.

3GPP-based Multimedia Telephony Services include MTSI that allows delivery of advanced multimedia conversational services and content over IMS-based networks. This includes specification of media handling and interaction, which includes media control, media codecs, as well as transport of media and control data. A MTSI call uses the Call Session Control Function (CSCF) mechanisms to route control-plane signalling between the UEs involved in the call (see e.g., FIG. 1). In the control plane, Application Servers (ASs) may be present and may provide supplementary services such as call hold/resume, call forwarding, and/or multi-party calls, etc.

In various embodiments, a first UE (e.g., a transmitter UE) captures (e.g., records) video, and transfers it to a second UE (e.g., a receiver UE) over the 3GPP network. The receiver UE decodes and renders the video. The first UE and/or second UE may be MTSI-based UEs. In MTSI, SIP serves as the application-layer control protocol to establish, modify, and terminate conversational multimedia sessions such as video conferences, Internet telephony calls, etc. SDP based signaling between the sending and receiving terminals allow for offer/answer considerations in the media-related capability negotiation, including codecs, bitrates, resolutions, etc. The transport of media in MTSI is based on RTP over UDP/IP.

FIG. 1 illustrates an example video conferencing environment 100 over a 3GPP MTSI-based conversational video system according to various embodiments. MTSI (also referred to as "Multimedia Telephony") is an IMS telephony service that builds on IMS capabilities to establish multimedia communications between terminals (e.g., UE1 102 and UE2 104 in FIG. 1, which may correspond to UEs 701a, 701b in FIG. 7) within and in-between operator networks (e.g., operator network A 106 and operator network B 108). The UEs 102 and 104 may connect to the IMS using either a fixed access network or a 3GPP access network. The UE 102 may be associated with a first user (User A) and the UE 104 may be associated with a second user (User B).

The MTSI architecture of FIG. 1 includes two operator networks, including an operator A network 106 and an operator B network 108. In this example, operator A network 106 serves UE1 and operator B network serves UE2 104. The UEs 102 and 104 may be and/or may include, MTSI clients and/or multi-stream MTSI (MSMTSI) clients. An "MTSI client in terminal" is an MTSI client that is implemented in a terminal or UE. An MSMTSI client is a multi-stream capable MTSI client supporting multiple streams. An MTSI client may support multiple streams, even of the same media type, without being an MSMTSI client. Such an MTSI client may, for example, add a second video to an ongoing video telephony session.

Figure 7:
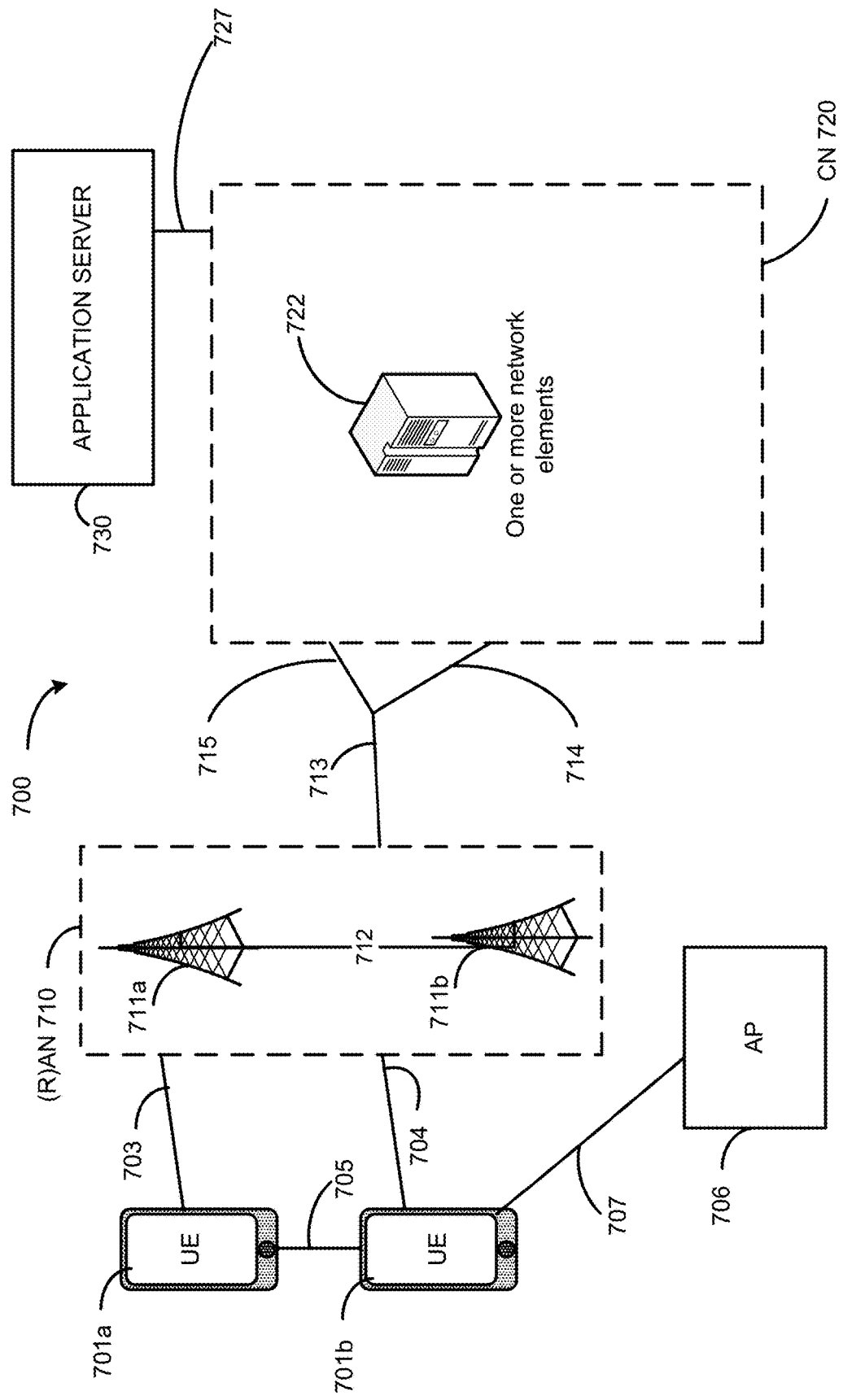
FIG. 7 illustrates an example architecture of a system 700 of a network, in accordance with various embodiments.

Each of the operator networks include respective radio access networks (RANs) 110a-b, serving general packet radio service (GPRS) support nodes (SGSNs) 112a-b, and gateway GPRS support nodes (GGSNs) 114a-b (see e.g., FIG. 7 and XR1 infra). Each of the operator networks 106 and 108 include various call session control function (CSCF) mechanisms to route control-plane signaling between the UEs involved in a call, including respective proxy CSCFs (P-CSCFs) 116*a-b* and serving CSCFs (S-CSCFs) 118*a-b*. Operator B network includes an interrogating CSCF (I-CSCF) 120. However, in other embodiments the operator A network may also include an I-CSCF. The operator networks may include other elements that are not shown by FIG. 1, such as a media resource function processor (MFRP), a media resource function controller (MRFC), a media gateway MGW, and/or other element(s).

The P-CSCF 116*a-b* (also referred to as "SIP proxy servers") accepts requests and services the requests internally, or forwards them to an appropriate entity. For example, the P-CSCF 116*a-b* forwards SIP register requests received from a UE (e.g., UE 102 and/or 104) to an entry point determined using the home domain name, as provided by the UE, forwards SIP messages received from the terminal/UE to an SIP server (e.g., the S-CSCF 118*a-b*) whose name the P-CSCF 116*a-b* has received as a result of the registration procedure, and forwards the SIP request or response to the UE. The P-CSCF 116*a-b* also performs SIP message compression/decompression.

The S-CSCF 118*a-b* (also referred to as an "SIP registration server") handles session states in the network. The S-CSCF 118*a-b* accepts registration requests and makes its information available through a location server (e.g., a home subscriber server (HSS)). The S-CSCF 118*a-b* also notifies subscribers about registration changes, and provides policy information (e.g., MPS IMS Subscription status and policy applicable to enterprise network subscribers) during the registration process (if available). The S-CSCF 118*a-b* provides endpoints with service event related information (e.g., notification of tones/announcement together with location of additional media resources, billing notification). The I-CSCF 120 is the contact point within an operator's network (e.g., the operator B network 108) for all IMS connections destined to a subscriber of that network operator (e.g., UE2 104), or a roaming subscriber currently located within that network operator's service area. The I-CSCF 120 also generates charging data records (CDRs) for charging and resource utilization.

Each operator network also include respective Application Servers (AS) 122*a-b*, which hosts and executes (e.g., provides) services. The AS 122*a-b* may influence and impact the SIP session on behalf of the services supported by the operator's network. The AS 122*a-b* may resides either in the user's home network or in a third party location (e.g., a network or a stand-alone AS). In the control plane, AS 122*a-b* provides supplementary services such as call hold/resume, call forwarding, multi-party calls, and/or the like. The AS 122*a-b* may be a session initiation protocol (SIP) AS, open service architecture (OSA) AS, or CAMEL IP multimedia service switching function (IM-SSF). The HSS/subscriber location function (SLF) 124 is a master database wherein the HSS portion of the HSS/SLF 124 includes (e.g., stores) subscription-related information to support the network entities actually handling calls/sessions and the SLF portion of the HSS/SLF includes (e.g., stores) information used to locate the subscription-related information.

The MTSI clients (e.g., in UE 102 and/or 104) transport speech, video, and real-time text using RTP over UDP or some other transport mechanism (e.g., QUIC (sometimes referred to as "Quick UDP Internet Connections")). For example, the MTSI clients may communicate via a media path 130. RTP Profile for Audio and Video Conferences with Minimal Control, also called RTP/AVP are supported for all media types, and Extended RTP Profile for RTCP-based Feedback (RTP/AVPF) may be supported for all other media types. The support of AVPF may require an MTSI client in the UE 102 and/or 104 to implement the RTCP transmission rules, the signalling mechanism for SDP and the feedback messages described herein. For a given RTP based media stream, the MTSI client in the UE 102 and/or 104 uses the same port number for sending and receiving RTP packets. This facilitates interworking with fixed/broadband access. However, the MTSI client may accept RTP packets that are not received from the same remote port where RTP packets are sent by the MTSI client.

For conversational video, the MSMTSI client in the UE 102 and/or 104 may be capable of receiving and locally composing at least one main video and one or more video thumbnails. A "thumbnail" video is in this context defined as a receive-only video "m="-line that is not the first video "m="-line in the SDP, and that is also not identified with any "a=content:main" or "a=content: slides". The MSMTSI client in the terminals also support receiving at least one thumbnail and may also support receiving any number of additional thumbnails, subject to MSMTSI client capability. The MSMTSI MRFs support sending at least two thumbnails and may support sending any number of additional thumbnails, subject to MSMTSI MRF capability. The MSMTSI client in the UE 102 and/or 104 may support sending at least one thumbnail-sized simulcast format of the main video, and may support sending also other simulcast formats. The MSMTSI MRFs may support receiving at least one thumbnail-sized simulcast format of the main video, and may support receiving also other simulcast formats.

For non-conversational video, the MSMTSI clients may support sending and receiving screenshare video. The first picture of the screen sharing video an MSMTSI client sends after being granted the screenshare binary floor control protocol (BFCP) floor may be random accessible, for example, as if a full intra request (FIR) would have been received.

The MSMTSI client in the UE 102 and/or 104 may be capable of receiving and/or may be capable of sending multiple simultaneous audio RTP streams. The number of multiple audio streams received at the MSMTSI client may be different than the number of multiple audio streams sent from the same MSMTSI client. Support for multiple audio streams in the direction from an MSMTSI MRF to an MSMTSI client in the terminal shall be interpreted as originating from different group call participants. The MSMTSI client in terminals also support local mixing of received audio streams, and may support use of spatial rendering tools, such as local Head-Related Transfer Function (HRTF), to perform audio panning and mixing of the multiple audio streams. Audio panning may enable the rendering device to choose to vary the audio levels of participants by adjusting the mixing gains. Multi-stream audio is not to be confused with multichannel audio-multi-stream audio may include one or more of mono, stereo, or multichannel audio RTP streams originating from different group call participants.

ROI Signaling for MTSI

The resolutions of capture devices, and therefore, compressed videos are rapidly increasing. With the latest development in video coding standards such as HEVC it is now reasonable to transport and store (e.g., 4K) content as part of an operational product. 4 k-by-2 k UHD high resolution cameras are now widely available and even 8 k-by-4 k demonstrations of live streaming have been realized. With such high resolution content, new usages in video conferencing and video streaming are now possible, like interactive zooming features.

The current adaptation means in conversational video services such as MTSI enable dynamic adaptation of video in terms of bandwidth, spatial resolution, orientation, etc., but do not enable to dynamically switch to a user-selected area in the video being streamed, and optimize encoding for this purpose. This limits the achievable video resolutions during the usage of interactive zoom features in video calls. Of course, a receiver application may always zoom in to the ROI and crop out the unwanted parts of the video (e.g., in response to the commands from the user interface), but the sending terminal in this case would still encode and transmit the entire video frame in the absence of any ROI signaling from the receiving terminal.

Therefore, signalling of the ROI information from an MTSI receiver to an MTSI sender may enable an MTSI sender to deliver a higher quality stream, by using the negotiated bitrate entirely or preponderantly on the encoding of the ROI part of the video. To enable this, signaling in both directions may be needed such as from sender to receiver to express capability, and from receiver to sender to express the desired ROI.

Video ROI for Point Cloud Video

Figure 2:
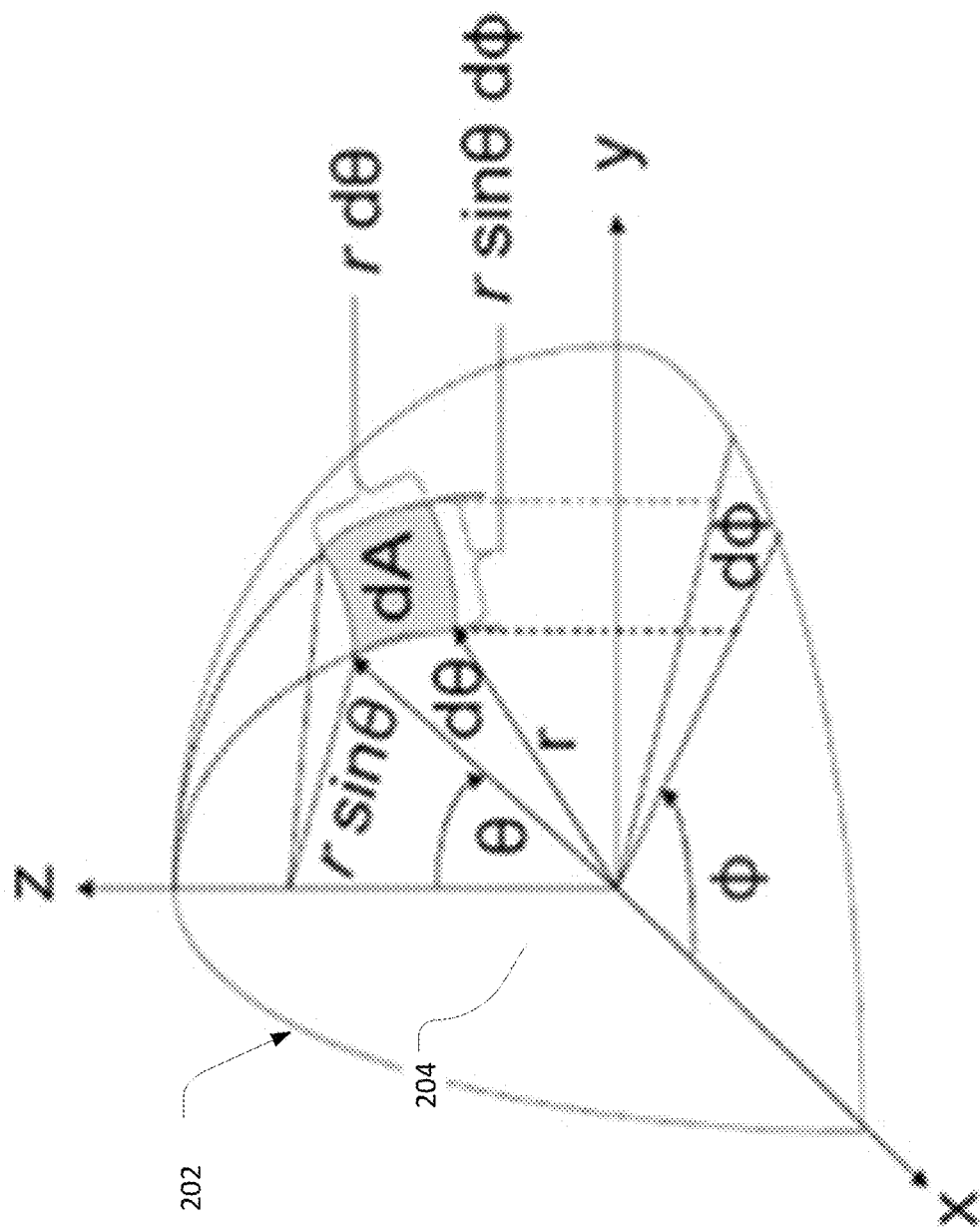
FIG. 2 illustrates viewport information for a region of interest in accordance with various embodiments.

Video ROI may comprise signaling a currently requested ROI of a video on the receiver side (e.g., UE1 102) to the sender (e.g., UE2 104) for appropriate encoding and transmission. For point cloud videos, the ROI or viewport indication may be made using the spherical coordinate system, such as shown by FIG. 2, to cover rotational movements of the viewport 202, plus the x-y-z (e.g., Cartesian) coordinates of the center point 204 of the sphere that contains the ROI or viewport 202 (to cover translational movements of the viewport 202).

Figure 3:
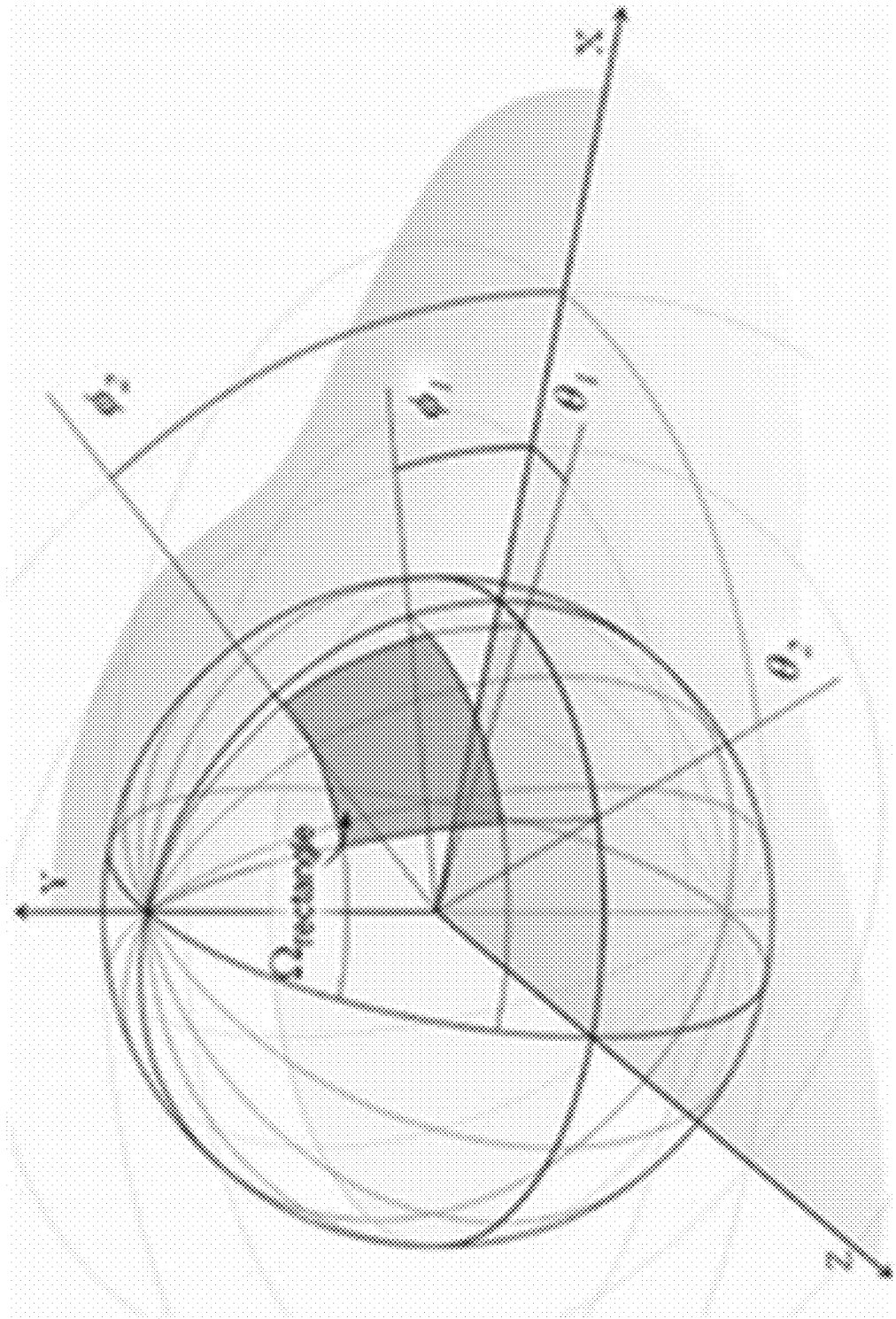
FIG. 3 illustrates angle parameters of viewport information in accordance with various embodiments.

By providing angle information (e.g., dθ and dφ in spherical coordinates) to each of the differential areas (e.g., the dA in FIG. 2), the MTSI receiver can communicate its requested ROI/viewport to the MTSI sender. This is depicted by FIG. 3, where ROI/viewport information is composed of communicating the θ1, θ2, φ1 and φ2 parameters, where θ1 is the angle between the VR origin and the left side of the differential area, θ2 is the angle between the VR origin and the right side of the differential area, φ1 is the angle between the VR origin and the top side of the differential area and φ2 is the angle between the VR origin and the bottom side of the differential area.

The VR origin is the position of the center point of the spatial subpart, which is given in pixel units, from the top left corner of the grid cell in which it is located and expressed by the values that contain x and y coordinates in pixel units (e.g., "640,360"). For example, the following definitions of various ROI parameters may be used:

ROI_yaw: signed integer in decimal representation expressing the yaw angle of the center of the desired ROI in arbitrary units.

ROI_pitch: signed integer in decimal representation expressing the pitch angle of center of the desired ROI in arbitrary units.

ROI_width: signed integer in decimal representation expressing the width in angular length of the desired ROI in arbitrary units.

ROI_height: signed integer in decimal representation expressing the height in angular length of the desired ROI in arbitrary units.

ROI_x: non-negative integer in decimal representation expressing the horizontal position of the top-left corner of the desired ROI in arbitrary units.

ROI_y: non-negative integer in decimal representation expressing the vertical position of the top-left corner of the desired ROI in arbitrary units.

Center_x: non-negative integer in decimal representation expressing the x-coordinate of the center point of the sphere containing the desired ROI in arbitrary units.—this is to cover translational movements of the viewport.

Center_y: non-negative integer in decimal representation expressing the y-coordinate of the center point of the sphere containing the desired ROI in arbitrary units.—this is to cover translational movements of the viewport.

Center_z: non-negative integer in decimal representation expressing the z-coordinate of the center point of the sphere containing the desired ROI in arbitrary units.—this is to cover translational movements of the viewport.

ROI_start_pitch: non-negative integer in decimal representation expressing the starting pitch angle of the specific area of the sphere, corresponding to the desired ROI.

ROI_end_pitch: non-negative integer in decimal representation expressing the ending pitch angle of the specific area of the sphere, corresponding to the desired ROI.

ROI_start_yaw: non-negative integer in decimal representation expressing the starting yaw angle of the specific area of the sphere, corresponding to the desired ROI.

ROI_end_yaw: non-negative integer in decimal representation expressing the ending yaw angle of the specific area of the sphere, corresponding to the desired ROI.

Figure 4:
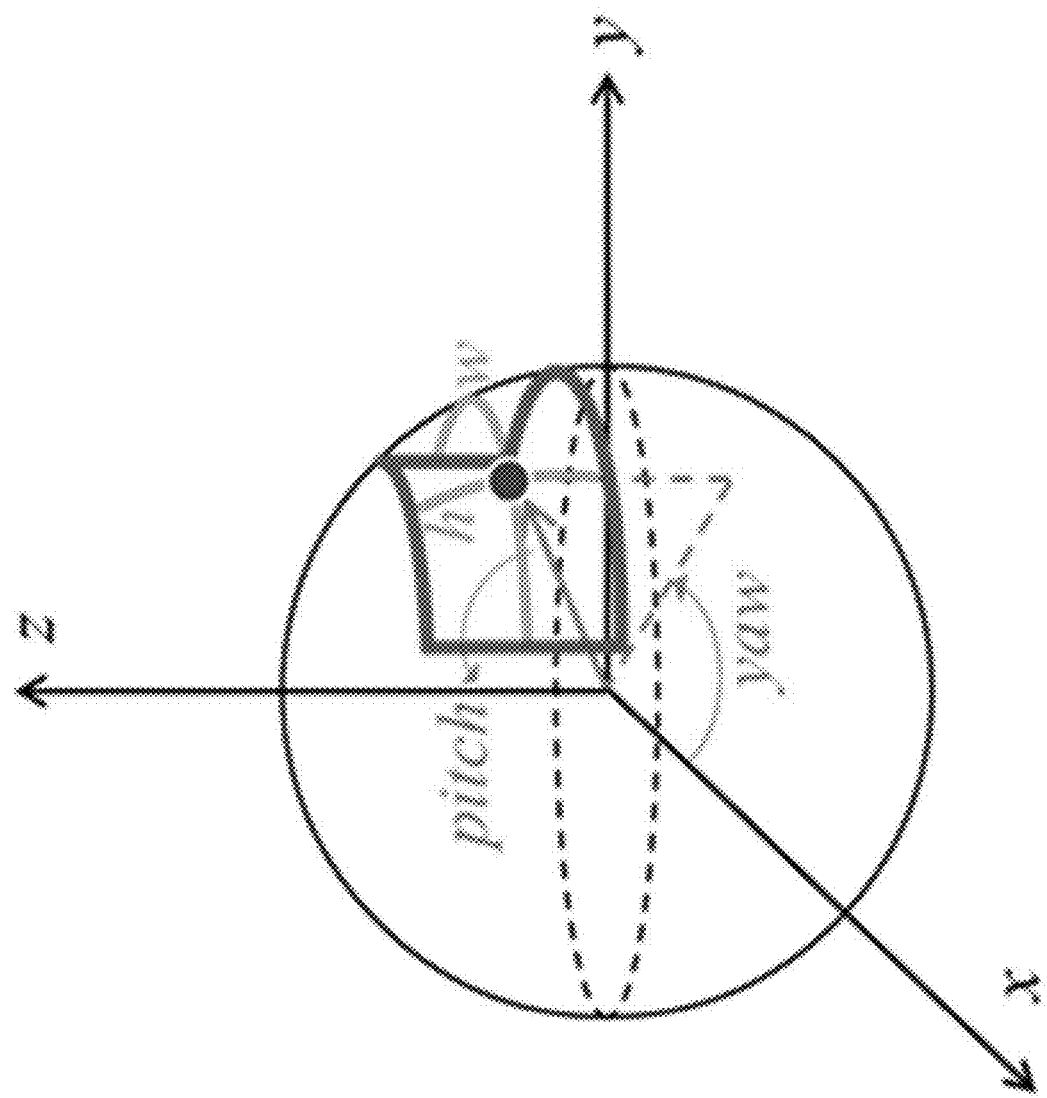
FIG. 4 illustrates additional parameters of viewport information in accordance with various embodiments.

FIG. 4 depicts these parameters of a viewpoint/ROI in accordance with various embodiments.

In some embodiments, the viewport information may include and/or be expressed using one or more other parameters in addition to or instead of the parameters listed above. For example, in some embodiments, the viewport information may include an elevation value, an azimuth value, and/or a tilt value to indicate the region of interest with respect to the reference point.

In embodiments, an MTSI client can support the following modes to request a desired region of interest in a given point cloud video (signalled from an MTSI receiver to an MTSI sender):

'Arbitrary ROI' mode, in which the MTSI receiver determines a specific ROI/viewport and signals this ROI/viewport to the MTSI sender.

'Pre-defined ROI' mode, in which the MTSI receiver selects one of the ROIs pre-determined by the MTSI sender and signals this ROI/viewport to the MTSI sender. In this mode, the MTSI receiver obtains the set of pre-defined ROIs/viewports from the MTSI sender during the SDP capability negotiation. This is for instance relevant when the sender has some predicted 'heatmap' of the popular viewports that the user may select.

An MTSI client supporting 'Arbitrary ROI' mode can offer 'Arbitary ROI' in SDP for all media streams containing point cloud video, where 'Arbitrary ROI' capabilities are desired. 'Arbitrary ROI' can be offered by including the a=rtcp-fb attribute with the 'Arbitrary ROI' type under the relevant media line scope. The 'Arbitrary ROI' type in conjunction with the RTCP feedback method can be expressed with the following parameter: 3gpp-roi-arbitrary-6d. A wildcard payload type ("*") may be used to indicate that the RTCP feedback attribute for 'Arbitrary ROI' signaling applies to all payload types. If several types of ROI signaling are supported and/or the same 'Arbitary ROI' can be specified for a subset of the payload types, several "a=rtcp-fb" lines can be used. Here is an example usage of this attribute to signal 'Arbitrary ROI' relative to a media line based on the RTCP feedback method:

a=rtcp-fb:*3gpp-roi-arbitrary-6d

An MTSI client supporting 'Pre-defined ROI' mode can offer 'Pre-defined ROI' in SDP for all media streams containing point cloud video, where 'Pre-defined ROI' capabilities are desired. 'Pre-defined ROI' can be offered by including the a=rtcp-fb attribute with the 'Pre-defined ROI' type under the relevant media line scope. The 'Pre-defined ROI' type in conjunction with the RTCP feedback method shall be expressed with the following parameter: 3gpp-roi-predefined-6d. A wildcard payload type ("*") may be used to indicate that the RTCP feedback attribute for 'Pre-defined ROI' signaling applies to all payload types. If several types of ROI signaling are supported and/or the same 'Pre-defined ROI' shall be specified for a subset of the payload types, several "a=rtcp-fb" lines can be used. Here is an example usage of this attribute to signal 'Pre-defined ROI' relative to a media line based on the RTCP feedback method:

a=rtcp-fb:*3gpp-roi-predefined-6d

The ABNF for rtcp-fb-val corresponding to the feedback types "3gpp-roi-arbitrary" and "3gpp-roi-predefined" is given as follows:

rtcp-fb-val=/"3gpp-roi-arbitrary-6d"
rtcp-fb-val=/"3gpp-roi-predefined-6d"

An MTSI sender supporting the 'Pre-defined ROI' feature can offer detailed pre-defined ROI information in the initial offer-answer negotiation by carrying it in SDP. Pre-defined ROIs can be offered by including the "a=predefined_ROI_3d" attribute under the relevant media line. One or more of the following parameters can be provided in the attribute for each pre-defined ROI (based on uncompressed captured point cloud video content):

ROI_ID: identifies the pre-defined ROI.
ROI_yaw: signed integer in decimal representation expressing the yaw angle of the center of the pre-defined ROI in arbitrary units.
ROI_pitch: signed integer in decimal representation expressing the pitch angle of center of the pre-defined ROI in arbitrary units.
ROI_width: signed integer in decimal representation expressing the width in angular length of the pre-defined ROI in arbitrary units.
ROI_height: signed integer in decimal representation expressing the height in angular length of the pre-defined ROI in arbitrary units.
ROI_x: non-negative integer in decimal representation expressing the horizontal position of the top-left corner of the predefined ROI in arbitrary units.
ROI_y: non-negative integer in decimal representation expressing the vertical position of the top-left corner of the predefined ROI in arbitrary units.
Center_x: non-negative integer in decimal representation expressing the x-coordinate of the center point of the sphere containing pre-defined ROI in arbitrary units.
Center_y: non-negative integer in decimal representation expressing the y-coordinate of the center point of the sphere containing pre-defined ROI in arbitrary units.
Center_z: non-negative integer in decimal representation expressing the z-coordinate of the center point of the sphere containing pre-defined ROI in arbitrary units.
ROI_start_pitch: non-negative integer in decimal representation expressing the starting pitch angle of the specific area of the sphere, corresponding to the pre-defined ROI.
ROI_end_pitch: non-negative integer in decimal representation expressing the ending pitch angle of the specific area of the sphere, corresponding to the pre-defined ROI.
ROI_start_yaw: non-negative integer in decimal representation expressing the starting yaw angle of the specific area of the sphere, corresponding to the pre-defined ROI.
ROI_end_yaw: non-negative integer in decimal representation expressing the ending yaw angle of the specific area of the sphere, corresponding to the pre-defined ROI.

In response to the SDP offer with the set of offered pre-defined ROIs provided using the "a=predefined_ROI_6d" line(s), an MTSI client accepting 'Pre-defined ROI' can provide an SDP answer using the "a=predefined_ROI_6d" line(s) containing the accepted set of pre-defined ROIs. Such an SDP answer can also contain the "a=rtcp-fb:*3gpp-roi-predefined-6d" line. The accepted set of pre-defined ROIs can be a subset of the offered set of pre-defined ROIs. If the SDP answer contains the a=rtcp-fb:*3gpp-roi-predefined-6d" line, but does not contain a "a=predefined_ROI_6d" line, this indicates that the MTSI client supports the 'Pre-defined ROI' mode, but none of the ROIs in the offered set of pre-defined ROIs is acceptable for this MTSI client. Following the successful negotiation of 'Pre-defined ROI', the MTSI receiver uses the RTCP feedback method to request from the accepted set of pre-defined ROIs and MTSI sender encodes the sent video accordingly to provide the requested pre-defined ROI.

A new SDP offer-answer negotiation can be performed to modify the set of pre-defined ROIs. The MTSI sender may update all the content of pre-defined ROIs, including the total number of pre-defined ROIs, and the position, size and name of each of the pre-defined ROIs.

The ROI information parameters exchanged via the a=predefined_ROI6d parameter in the SDP signalling defined above are independent of the negotiated video resolution for the encoded content. Instead, the ROI information parameters defined above take as reference the original point cloud video content, i.e., uncompressed captured point cloud video content. Therefore, no modifications or remappings of ROI parameters are necessary during any transcoding that results in changes in video resolution or during potential dynamic adaptations of encoded video resolution at the sender.

The signalling of 'Arbitrary ROI' and 'Pre-defined ROI' requests uses RTCP feedback messages. The RTCP feedback message is identified by PT (payload type)=PSFB (206) which refers to payload-specific feedback message. The FCI format for ROI is composed of the following parameters (uncompressed captured point cloud video content):

ROI_yaw: signed integer in decimal representation expressing the yaw angle of the center of the desired ROI in arbitrary units.
ROI_pitch: signed integer in decimal representation expressing the pitch angle of center of the desired ROI in arbitrary units.
ROI_width: signed integer in decimal representation expressing the width in angular length of the desired ROI in arbitrary units.

ROI_height: signed integer in decimal representation expressing the height in angular length of the desired ROI in arbitrary units.

ROI_x: non-negative integer in decimal representation expressing the horizontal position of the top-left corner of the desired ROI in arbitrary units.

ROI_y: non-negative integer in decimal representation expressing the vertical position of the top-left corner of the desired ROI in arbitrary units.

Center_x: non-negative integer in decimal representation expressing the x-coordinate of the center point of the sphere containing the desired ROI in arbitrary units.

Center_y: non-negative integer in decimal representation expressing the y-coordinate of the center point of the sphere containing the desired ROI in arbitrary units.

Center_z: non-negative integer in decimal representation expressing the z-coordinate of the center point of the sphere containing the desired ROI in arbitrary units.

ROI_start_pitch: non-negative integer in decimal representation expressing the starting pitch angle of the specific area of the sphere, corresponding to the desired ROI.

ROI_end_pitch: non-negative integer in decimal representation expressing the ending pitch angle of the specific area of the sphere, corresponding to the desired ROI.

ROI_start_yaw: non-negative integer in decimal representation expressing the starting yaw angle of the specific area of the sphere, corresponding to the desired ROI.

ROI_end_yaw: non-negative integer in decimal representation expressing the ending yaw angle of the specific area of the sphere, corresponding to the desired ROI.

ROI_ID: identifies the pre-defined ROI selected by the MTSI receiver.

For 'Arbitrary ROI' requests, the RTCP feedback message for ROI can contain the parameters one or more of the parameters ROI_yaw, ROI_pitch, ROI_width, ROI_height, ROI_x, ROI_y, Center_x, Center_y, Center_z, ROI_start_pitch, ROI_end_pitch, ROI_start_yaw and ROI_end_yaw.

For 'Pre-defined ROI' requests, the RTCP feedback message for ROI can contain the ROI_ID parameter. The value of ROI_ID can be acquired from the "a=predefined_ROI_6d" attributes that are indicated in the SDP offer-answer negotiation. The value for the ROI M parameter can be indicated using one byte. The FCI for the RTCP feedback message for 'Pre-defined ROI' can follow the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    all ones           |    ROI_ID   |
+-+-+-+-+-+-+-+-+-+-+-+-+-+-+-+-+-+-+-+-+-+-+-+-+-+-+-+-+-+-+-+-+
```

An MTSI client supporting 'Arbitrary ROI' or 'Pre-defined ROI' can also offer 'Sent ROI' in SDP for all media streams containing point cloud video. An MTSI sender accepting "Arbitrary ROI' or 'Pre-defined ROI' can also accept an accompanying 'Sent ROI' offer. 'Sent ROI' is specified in clause is offered by including the a=extmap attribute indicating the 'Sent ROI' URN under the relevant media line scope. The 'Sent ROI' URN corresponding to an arbitrary ROI is: urn:3gpp:roi-sent-6d. The 'Sent ROI' URN corresponding to a pre-defined ROI can be: urn:3gpp:pre-defined-roi-sent-6d. Here is an example usage of this URN to signal 'Sent ROI' relative to a media line:

a=extmap:7 urn:3gpp:roi-sent-6d

The number 7 in the example may be replaced with any number in the range 1-14.

'Sent ROI' involves signalling from the MTSI sender to the MTSI receiver and this helps the MTSI receiver to know the actually sent ROI or viewport corresponding to the point cloud video transmitted by the MTSI sender, i.e., which may or may not agree with the ROI requested by the MTSI receiver, but can contain it so that the end user is still able to see the desired ROI/viewport.

If the sent ROI corresponds to an arbitrary ROI (indicated via the URN urn:3gpp:roi-sent-6d in the SDP negotiaton), the signalling of the ROI can use RTP header extensions and carry one or more of the ROI_yaw, ROI_pitch, ROI_width, ROI_height, ROI_x, ROI_y, Center_x, Center_y, Center_z, ROI_start_pitch, ROI_end_pitch, ROI_start_yaw and ROI_end_yaw parameters corresponding to the actually sent ROI.

If the sent ROI corresponds to one of the pre-defined ROIs (indicated via the URN urn:3gpp:predefined-roi-sent-6d in the SDP negotiation), then the signalling of the ROI can again use the RTP header extensions and carry the ROI_ID parameter corresponding to the actually sent pre-defined ROI. The one-byte form of the header can be used. The value for the ROI_ID parameter can be indicated using one byte, with the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  ID  | len = 0 |  ROI_ID  |      zero padding         |
+-+-+-+-+-+-+-+-+-+-+-+-+-+-+-+-+-+-+-+-+-+-+-+-+-+-+-+-+-+-+-+-+
```

In this case, the length field takes the value 0 to indicate that only a single byte follows.

'Arbitrary ROI' and 'Pre-defined ROI' may be supported bi-directionally or uni-directionally depending on how clients negotiate to support the feature during SDP capability negotiations. For terminals with asymmetric capability (e.g. the ability to process ROI information but not detect/signal ROI information), the sendonly and recvonly attributes may be used. Terminals should express their capability in each direction sufficiently clearly such that signals are only sent in each direction to the extent that they both express useful information and can be processed by the recipient.

'Arbitary ROI' and 'Pre-defined ROI' support may be offered at the same time, or only one of them may be offered. When both capabilities are successfully negotiated by the MTSI sender and receiver, it is the MTSI receiver's decision to request an arbitrary ROI or one of the pre-defined ROIs at a given time. When pre-defined ROIs are offered by the MTSI sender, it is also the responsibility of the MTSI sender to detect and track any movements of the ROI, e.g., the ROI could be a moving car, or moving person, etc. and refine the content encoding accordingly.

The presence of ROI signalling should not impact the negotiated resolutions (based on SDP imageattr attribute) between the sending and receiving terminals. The only difference is that the sending terminal should encode only the ROI with the negotiated resolution rather than the whole captured frame, and this would lead to a higher overall resolution and better user experience than having the receiving terminal zoom in on the ROI and crop out the rest of the frame.

The ROI information parameters exchanged via the RTP/RTCP signalling defined above are independent of the negotiated video resolution for the encoded content. Instead, the ROI information parameters defined above take as reference the original video content, i.e., uncompressed captured point cloud degree video content. Therefore, no modifications or remappings of ROI parameters are necessary during any transcoding that results in changes in video resolution or during potential dynamic adaptations of encoded video resolution at the sender.

Figure 5:
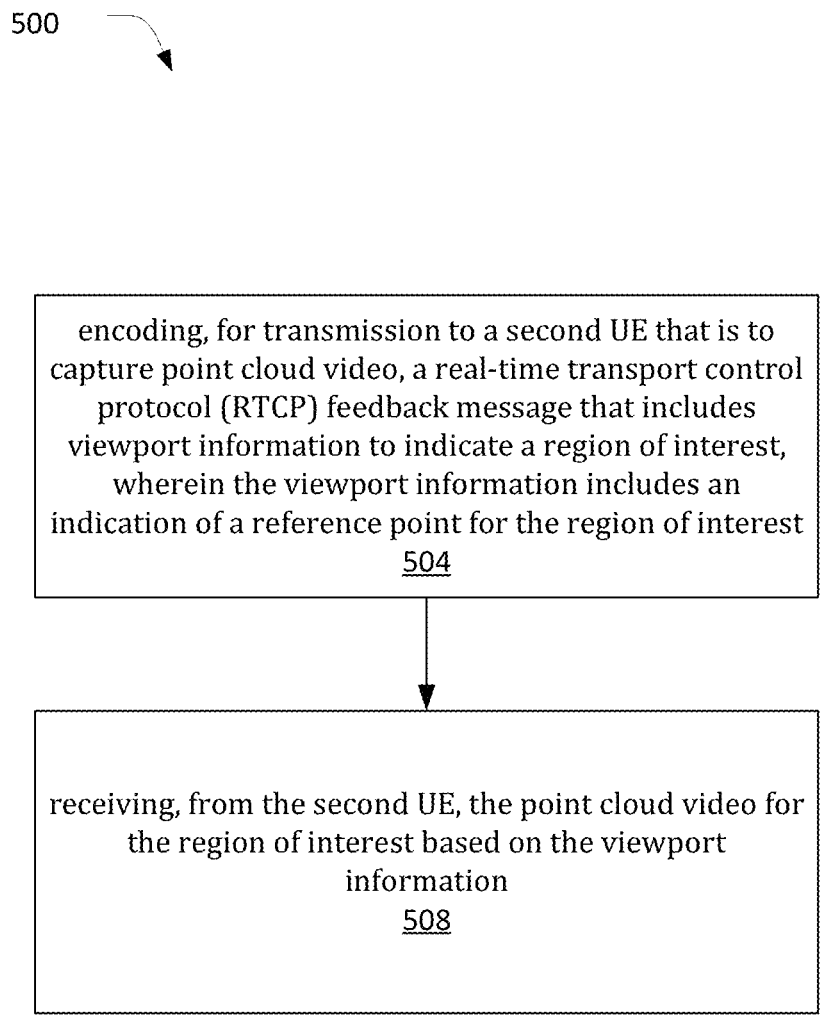
FIG. 5 illustrates an operation flow/algorithmic structure in accordance with some embodiments.

FIG. 5 illustrates an operation flow/algorithmic structure 500 in accordance with some embodiments. The operation flow/algorithmic structure 500 may be performed, in part or in whole, by a first UE (e.g., UE 701a and/or UE 701b, discussed infra), such as a receiving UE, or components thereof. For example, in some embodiments the operation flow/algorithmic structure 500 may be performed by the baseband circuitry implemented in the UE.

At 504, the operation flow/algorithmic structure 500 may include encode, for transmission to a second UE that is to capture point cloud video, a real-time transport protocol (RTCP) feedback message that includes viewport information to indicate a region of interest, wherein the viewport information includes an indication of a reference point for the region of interest.

At 508, the operation flow/algorithmic structure 500 may further include receiving, from the second UE, the point cloud video for the region of interest based on the viewport information.

Figure 6:
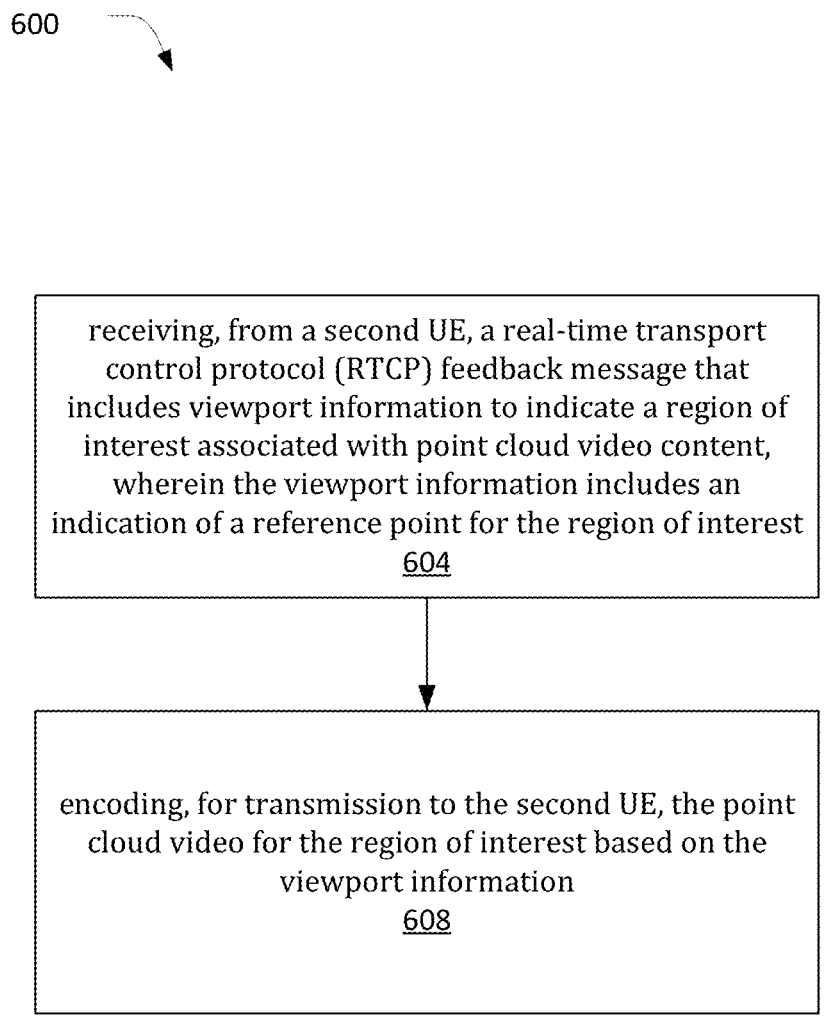
FIG. 6 illustrates another operation flow/algorithmic structure in accordance with some embodiments.

FIG. 6 illustrates another operation flow/algorithmic structure 600 in accordance with some embodiments. The operation flow/algorithmic structure 600 may be performed, in part or in whole, by a first UE (e.g., UE 701a and/or UE 701b, discussed infra), such as a transmitting UE, or components thereof. For example, in some embodiments the operation flow/algorithmic structure 600 may be performed by the baseband circuitry implemented in the first UE.

At 604, the operation flow/algorithmic structure 600 may include receiving, from a second UE, a real-time transport control protocol (RTCP) feedback message that includes viewport information to indicate a region of interest associated with point cloud video content, wherein the viewport information includes an indication of a reference point for the region of interest.

At 608, the method may further include encoding, for transmission to the second UE, the point cloud video for the region of interest based on the viewport information Systems and Implementations FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 701a and UE 701b (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some of these embodiments, the UEs 701 may be NB-IoT UEs 701. NB-IoT provides access to network services using physical layer optimized for very low power consumption (e.g., full carrier BW is 180 kHz, subcarrier spacing can be 3.75 kHz or 15 kHz). A number of E-UTRA functions are not used for NB-IoT and need not be supported by RAN nodes 711 and UEs 701 only using NB-IoT. Examples of such E-UTRA functions may include inter-RAT mobility, handover, measurement reports, public warning functions, GBR, CSG, support of HeNBs, relaying, carrier aggregation, dual connectivity, NAICS, MBMS, real-time services, interference avoidance for in-device coexistence, RAN assisted WLAN interworking, sidelink communication/discovery, MDT, emergency call, CS fallback, self-configuration/self-optimization, among others. For NB-IoT operation, a UE 701 operates in the DL using 12 sub-carriers with a sub-carrier BW of 15 kHz, and in the UL using a single sub-carrier with a sub-carrier BW of either 3.75 kHz or 15 kHz or alternatively 3, 6 or 12 sub-carriers with a sub-carrier BW of 15 kHz.

In various embodiments, the UEs 701 may be MF UEs 701. MF UEs 701 are LTE-based UEs 701 that operate (exclusively) in unlicensed spectrum. This unlicensed spectrum is defined in MF specifications provided by the MulteFire Forum, and may include, for example, 1.9 GHz (Japan), 3.5 GHz, and 5 GHz. MulteFire is tightly aligned with 3GPP standards and builds on elements of the 3GPP specifications for LAA/eLAA, augmenting standard LTE to operate in global unlicensed spectrum. In some embodiments, LBT may be implemented to coexist with other unlicensed spectrum networks, such as WiFi, other LAA networks, or the like. In various embodiments, some or all UEs 701 may be NB-IoT UEs 701 that operate according to MF. In such embodiments, these UEs 701 may be referred to as "MF NB-IoT UEs 701," however, the term "NB-IoT UE 701" may refer to an "MF UE 701" or an "MF and NB-IoT UE 701" unless stated otherwise. Thus, the terms "NB-IoT UE 701," "MF UE 701," and "MF NB-IoT UE 701" may be used interchangeably throughout the present disclosure.

The UEs 701 may be configured to connect, for example, communicatively couple, with an or RAN 710. In embodiments, the RAN 710 may be an NG RAN or a 5G RAN, an E-UTRAN, an MF RAN, or a legacy RAN, such as a UTRAN or GERAN. As used herein, the term "NG RAN" or the like may refer to a RAN 710 that operates in an NR or 5G system 700, the term "E-UTRAN" or the like may refer to a RAN 710 that operates in an LTE or 4G system 700, and the term "MF RAN" or the like refers to a RAN 710 that operates in an MF system 100. The UEs 701 utilize connections (or channels) 703 and 704, respectively, each of which comprises a physical communications interface or layer (discussed in further detail below). The connections 103 and 104 may include several different physical DL channels and several different physical UL channels. As examples, the physical DL channels include the PDSCH, PMCH, PDCCH, EPDCCH, MPDCCH, R-PDCCH, SPDCCH, PBCH, PCFICH, PHICH, NPBCH, NPDCCH, NPDSCH, and/or any other physical DL channels mentioned herein. As examples, the physical UL channels include the PRACH, PUSCH, PUCCH, SPUCCH, NPRACH, NPUSCH, and/or any other physical UL channels mentioned herein.

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 701 may directly exchange communication data via a ProSe interface 705. The ProSe interface 705 may alternatively be referred to as a SL interface 705 and may comprise one or more physical and/or logical channels, including but not limited to the PSCCH, PSSCH, PSDCH, and PSBCH.

The UE 701*b* is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701*b*, RAN 710, and AP 706 may be configured to utilize LWA operation and/or LWIP operation. The LWA operation may involve the UE 701*b* in RRC_CONNECTED being configured by a RAN node 711*a-b* to utilize radio resources of LTE and WLAN. LWIP operation may involve the UE 701*b* using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711*a* and 711*b* (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, MF-APs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (e.g., a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher BW compared to macrocells.

In some embodiments, all or parts of the RAN nodes 711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 711; a MAC/PHY split wherein RRC, PDCP, RLC, and MAC layers are operated by the CRAN/vBBUP and the PHY layer is operated by individual RAN nodes 711; or a "lower PHY" split wherein RRC, PDCP, RLC, MAC layers and upper portions of the PHY layer are operated by the CRAN/vBBUP and lower portions of the PHY layer are operated by individual RAN nodes 711. This virtualized framework allows the freed-up processor cores of the RAN nodes 711 to perform other virtualized applications. In some implementations, an individual RAN node 711 may represent individual gNB-DUs that are connected to a gNB-CU via individual F1 interfaces (not shown by FIG. 7). In these implementations, the gNB-DUs may include one or more remote radio heads or RFEMs, and the gNB-CU may be operated by a server that is located in the RAN 710 (not shown) or by a server pool in a similar manner as the CRAN/vBBUP. Additionally or alternatively, one or more of the RAN nodes 711 may be next generation eNBs (ng-eNBs), which are RAN nodes that provide E-UTRA user plane and control plane protocol terminations toward the UEs 701, and are connected to a 5GC via an NG interface (discussed infra). In MF implementations, the MF-APs 711 are entities that provide MulteFire radio services, and may be similar to eNBs 711 in an 3GPP architecture. Each MF-AP 711 includes or provides one or more MF cells.

In V2X scenarios one or more of the RAN nodes 711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs 701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

Downlink and uplink transmissions may be organized into frames with 10 ms durations, where each frame includes ten 1 ms subframes. A slot duration is 14 symbols with Normal CP and 12 symbols with Extended CP, and scales in time as a function of the used sub-carrier spacing so that there is always an integer number of slots in a subframe. In LTE implementations, a DL resource grid can be used for DL transmissions from any of the RAN nodes 711 to the UEs 701, while UL transmissions from the UEs 701 to RAN nodes 711 can utilize a suitable UL resource grid in a similar manner. These resource grids may refer to time-frequency grids, and indicate physical resource in the DL or UL in each slot. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. The duration of the resource grid in the time domain corresponds to one slot in a radio frame. The resource grids comprises a number of RBs, which describe the mapping of certain physical channels to REs. In the frequency domain, this may represent the smallest quantity of resources that currently can be allocated. Each RB comprises a collection of REs. An RE is the smallest time-frequency unit in a resource grid. Each RE is uniquely identified by the index pair (k,l) in a slot where k=0, ..., $N_{RB}^{DL}N_{sc}^{RB}-1$ and l=0, ..., $N_{symb}^{DL}-1$ are the indices in the frequency and time domains, respectively. RE (k,l) on antenna port p corresponds to the complex value $a_{k,l}^{(p)}$. An antenna port is defined such that the channel over which a symbol on the antenna port is conveyed can be inferred from the channel over which another symbol on the same antenna port is conveyed. There is one resource grid per antenna port. The set of antenna ports supported depends on the reference signal configuration in the cell, and these aspects are discussed in more detail in 3GPP TS 36.211.

In NR/5G implementations, DL and UL transmissions are organized into frames with 10 ms durations each of which includes ten 1 ms subframes. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with a half-frame 0 comprising subframes 0-4 and a half-frame 1 comprising subframes 5-9. There is one set of frames in the UL and one set of frames in the DL on a carrier. Uplink frame number i for transmission from the UE 701 starts $T_{TA}=(N_{TA}+N_{TA,offset})T_c$ before the start of the corresponding downlink frame at the UE where $N_{TA,offset}$ is given by 3GPP TS 38.213. For subcarrier spacing configuration μ, slots are numbered $n_s^\mu \in \{0, ..., N_{slot}^{subframe,\mu}-1\}$ in increasing order within a subframe and $n_{s,f}^\mu \in \{0, ..., N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by tables 4.3.2-1 and 4.3.2-2 of 3GPP TS 38.211. The start of slot $n_s^\mu$ in a subframe is aligned in time with the start of OFDM symbol $n_s^\mu N_{symb}^{slot}$ in the same subframe. OFDM symbols in a slot can be classified as 'downlink', 'flexible', or 'uplink', where downlink transmissions only occur in 'downlink' or 'flexible' symbols and the UEs 701 only transmit in 'uplink' or 'flexible' symbols.

For each numerology and carrier, a resource grid of $N_{grid,x}^{size,\mu}N_{sc}^{RB}$ subcarriers and $N_{symb}^{subframe,\mu}$ OFDM symbols is defined, starting at common RB $N_{grid}^{start,\mu}$ indicated by higher-layer signaling. There is one set of resource grids per transmission direction (i.e., uplink or downlink) with the subscript x set to DL for downlink and x set to UL for uplink. There is one resource grid for a given antenna port p, subcarrier spacing configuration μ, and transmission direction (i.e., downlink or uplink).

An RB is defined as $N_{sc}^{RB}=12$ consecutive subcarriers in the frequency domain. Common RBs are numbered from 0 and upwards in the frequency domain for subcarrier spacing configuration μ. The center of subcarrier 0 of common resource block 0 for subcarrier spacing configuration μ coincides with 'point A'. The relation between the common resource block number $n_{CRB}^\mu$ in the frequency domain and resource elements (k,l) for subcarrier spacing configuration μ is given by $$n_{CRB}^\mu = \left\lfloor \frac{k}{N_{sc}^{RB}} \right\rfloor$$

where k is defined relative to point A such that k=0 corresponds to the subcarrier centered around point A. Point A serves as a common reference point for resource block grids and is obtained from offsetToPointA for a PCell downlink where offsetToPointA represents the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2; and absoluteFrequencyPointA for all other cases where absoluteFrequencyPointA represents the frequency-location of point A expressed as in ARFCN.

A PRB for subcarrier configuration µ are defined within a BWP and numbered from 0 to $N_{BWP,i}^{size,\mu}-1$ where i is the number of the BWP. The relation between the physical resource block $n_{PRB}^{\mu}$ in BWPi and the common RB $n_{CRB}^{\mu}$ is given by $n_{CRB}^{\mu}=n_{CRB}^{\mu}+N_{BWP,i}^{start,\mu}$ where $N_{BWP,i}^{start,\mu}$ is the common RB where BWP starts relative to common RB 0. VRBs are defined within a BWP and numbered from 0 to $N_{BWP,i}^{size}-1$ where i is the number of the BWP.

Each element in the resource grid for antenna port p and subcarrier spacing configuration µ is called an RE and is uniquely identified by $(k,l)_{p,\mu}$ where k is the index in the frequency domain and l refers to the symbol position in the time domain relative to some reference point. Resource element $(k,l)_{p,\mu}$ corresponds to a physical resource and the complex value $a_{k,l}^{(p,\mu)}$. An antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A BWP is a subset of contiguous common resource blocks defined in subclause 4.4.4.3 of 3GPP TS 38.211 for a given numerology $\mu_i$ in BWP i on a given carrier. The starting position $N_{BWP,i}^{start,\mu}$ and the number of resource blocks $N_{BWP,i}^{size,\mu}$ in a BWP shall fulfil $N_{grid,x}^{start,\mu} \le N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \le N_{grid,x}^{start,\mu} + N_{grid,x}^{size,\mu}$, respectively. Configuration of a BWP is described in clause 12 of 3GPP TS 38.213. The UEs 701 can be configured with up to four BWPs in the DL with a single DL BWP being active at a given time. The UEs 701 are not expected to receive PDSCH, PDCCH, or CSI-RS (except for RRM) outside an active BWP. The UEs 701 can be configured with up to four BWPs in the UL with a single UL BWP being active at a given time. If a UE 701 is configured with a supplementary UL, the UE 701 can be configured with up to four additional BWPs in the supplementary UL with a single supplementary UL BWP being active at a given time. The UEs 701 do not transmit PUSCH or PUCCH outside an active BWP, and for an active cell, the UEs do not transmit SRS outside an active BWP.

An NB is defined as six non-overlapping consecutive PRBs in the frequency domain. The total number of DL NBs in the DL transmission BW configured in the cell is given by $$N_{NB}^{DL} = \left\lfloor \frac{N_{RB}^{DL}}{6} \right\rfloor.$$

The NBs are numbered $n_{NB}=0, \ldots, N_{NB}^{DL}-1$ in order of increasing PRB number where narrowband $n_{NB}$ is comprises $$PRB\ indices: \begin{cases} 6n_{NB}+i_0+i & \text{if } N_{RB}^{UL} \bmod 2 = 0 \\ 6n_{NB}+i_0+i & \text{if } N_{RB}^{UL} \bmod 2 = 1 \text{ and } n_{NB} < N_{NB}^{UL}/2 \\ 6n_{NB}+i_0+i+1 & \text{if } N_{RB}^{UL} \bmod 2 = 1 \text{ and } n_{NB} \ge N_{NB}^{UL}/2 \end{cases}$$

$$i = 0, 1, \ldots, 5$$
$$\text{where } i_0 = \left\lfloor \frac{N_{RB}^{UL}}{2} \right\rfloor - \frac{6 N_{NB}^{UL}}{2}.$$

If $N_{NB}^{UL} \ge 4$, a wideband is defined as four non-overlapping narrowbands in the frequency domain. The total number of uplink widebands in the uplink transmission bandwidth configured in the cell is given by $$N_{WB}^{UL} = \left\lfloor \frac{N_{NB}^{UL}}{4} \right\rfloor$$

and the widebands are numbered $n_{WB}=0, \ldots, N_{WB}^{UL}-1$ in order of increasing narrowband number where wideband $n_{WB}$ is composed of narrowband indices $4n_{WB}+ii$ where $ii=0, 1, \ldots, 3$. If $N_{NB}^{UL}<4$, then $N_{WB}^{UL}=1$ and the single wideband is composed of the N non-overlapping narrowband(s).

There are several different physical channels and physical signals that are conveyed using RBs and/or individual REs. A physical channel corresponds to a set of REs carrying information originating from higher layers. Physical UL channels may include PUSCH, PUCCH, PRACH, and/or any other physical UL channel(s) discussed herein, and physical DL channels may include PDSCH, PBCH, PDCCH, and/or any other physical DL channel(s) discussed herein. A physical signal is used by the physical layer (e.g., PHY XV10 of Figure XV) but does not carry information originating from higher layers. Physical UL signals may include DMRS, PTRS, SRS, and/or any other physical UL signal(s) discussed herein, and physical DL signals may include DMRS, PTRS, CSI-RS, PSS, SSS, and/or any other physical DL signal(s) discussed herein.

The PDSCH carries user data and higher-layer signaling to the UEs 701. Typically, DL scheduling (assigning control and shared channel resource blocks to the UE 701 within a cell) may be performed at any of the RAN nodes 711 based on channel quality information fed back from any of the UEs 701. The downlink resource assignment information may be sent on the PDCCH used for (e.g., assigned to) each of the UEs 701. The PDCCH uses CCEs to convey control information (e.g., DCI), and a set of CCEs may be referred to a "control region." Control channels are formed by aggregation of one or more CCEs, where different code rates for the control channels are realized by aggregating different numbers of CCEs. The CCEs are numbered from 0 to $N_{CCE,k}-1$, where $N_{CCE,k}-1$ is the number of CCEs in the control region of subframe k. Before being mapped to REs, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical REs known as REGs. Four QPSK symbols may be mapped to each REG. The PDCCH can be transmitted using one or more CCEs, depending on the size of the DCI and the channel condition. There can be four or more different PDCCH formats defined with different numbers of CCEs (e.g., aggregation level, L=1, 2, 4, or 8 in LTE and L=1, 2, 4, 8, or 16 in NR). The UE 701 monitors a set of PDCCH candidates on one or more activated serving cells as configured by higher layer signaling for control information (e.g., DCI), where monitoring implies attempting to decode each of the PDCCHs (or PDCCH candidates) in the set according to all the monitored DCI formats (e.g., DCI formats 0 through 6-2 as discussed in section 5.3.3 of 3GPP TS 38.212, DCI formats 0_0 through 2_3 as discussed in section 7.3 of 3GPP TS 38.212, or the like). The UEs 701 monitor (or attempt to decode) respective sets of PDCCH candidates in one or more configured monitoring occasions according to the corresponding search space configurations. A DCI transports DL, UL, or SL scheduling information, requests for aperiodic CQI reports, LAA common information, notifications of MCCH change, UL power control commands for one cell and/or one RNTI, notification of a group of UEs 701 of a slot format, notification of a group of UEs of the PRB(s) and OFDM symbol(s) where UE may assume no transmission is intended for the UE, TPC commands for PUCCH and PUSCH, and/or TPC commands for PUCCH and PUSCH. The DCI coding steps are discussed in 3GPP TS 38.212.

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

As alluded to previously, the PDCCH can be used to schedule DL transmissions on PDSCH and UL transmissions on PUSCH, wherein the DCI on PDCCH includes, inter alia, downlink assignments containing at least modulation and coding format, resource allocation, and HARQ information related to DL-SCH; and/or uplink scheduling grants containing at least modulation and coding format, resource allocation, and HARQ information related to UL-SCH. In addition to scheduling, the PDCCH can be used to for activation and deactivation of configured PUSCH transmission(s) with configured grant; activation and deactivation of PDSCH semi-persistent transmission; notifying one or more UEs 701 of a slot format; notifying one or more UEs 701 of the PRB(s) and OFDM symbol(s) where a UE 701 may assume no transmission is intended for the UE; transmission of TPC commands for PUCCH and PUSCH; transmission of one or more TPC commands for SRS transmissions by one or more UEs 701; switching an active BWP for a UE 701; and initiating a random access procedure.

In NR implementations, the UEs 701 monitor (or attempt to decode) respective sets of PDCCH candidates in one or more configured monitoring occasions in one or more configured CORESETs according to the corresponding search space configurations. A CORESET may include a set of PRBs with a time duration of 1 to 3 OFDM symbols. A CORESET may additionally or alternatively include $N_{RB}^{CORESET}$ RBs in the frequency domain and $N_{symb}^{CORESET} \in \{1,2,3\}$ symbols in the time domain. A CORESET includes six REGs numbered in increasing order in a time-first manner, wherein an REG equals one RB during one OFDM symbol. The UEs 701 can be configured with multiple CORESETS where each CORESET is associated with one CCE-to-REG mapping only. Interleaved and non-interleaved CCE-to-REG mapping are supported in a CORESET. Each REG carrying a PDCCH carries its own DMRS.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol. LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the BWs of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

In embodiments, the UEs 701 implement or operate a client for MTSI supporting conversational speech (including DTMF), video, and text transported over RTP with the scope to deliver a user experience equivalent to or better than that of Circuit Switched (CS) conversational services using the same amount of network resources. MTSI defines media handling (e.g., signaling, transport, jitter buffer management, packet-loss handling, adaptation, etc.), as well as interactivity (e.g., adding or dropping media during a call). In these embodiments, the UEs 701 may connect to the IMS (e.g., AS 730) using 3GPP access (e.g., via RAN 710 and CN 720) or using non-3GPP access (e.g., via WLAN 706, Bluetooth, DECT/NG DECT).

According to various embodiments, UEs 701 may communicate with one another using VoLTE mechanisms. VoLTE is a standard for high-speed wireless communication, which is based on IMS networks where specific profiles for control and media planes of voice service over an LTE network may be defined. In various embodiments, SIP is used to convey information during a call setup procedure. SIP is an application-layer control protocol for creating, modifying, and terminating sessions (e.g., Internet multimedia conferences, Internet telephone calls, and multimedia distribution using an offer/answer model) that works independently of underlying transport protocols and without dependency on the type of session that is being established. SIP works in concert with various protocols for carrying various forms of real-time multimedia session data such as voice, video, and/or text messages. SIP works in concert with these protocols by enabling Internet endpoints (referred to as "user agents") to discover one another and to agree on a characterization of a session they would like to share. For locating prospective session participants, and for other functions, SIP enables the creation of an infrastructure of network hosts (referred to as "proxy servers") to which user agents can send registrations, invitations to sessions, and other requests.

SIP messages used to create sessions may carry session descriptions that allow participants to agree on a set of compatible media types to be used during the communication session. The session descriptions may be formatted according to SDP, wherein media type and parameter negotiation and media setup is performed with SDP that is carried as payload in SIP messages. SIP employs many aspects of the HTTP request/response model, including reuse of header fields, encoding rules, and status codes of HTTP. Furthermore, a suitable transport layer protocol may be used to convey data before session establishment (e.g., audio and/or video as early media) or during an established session. The transport layer protocol may include, for example, UDP, TCP, RSTP, SCTP, RTP, SRTP, and/or the like for the transmission of media streams (e.g., voice, video). Moreover, the SIP messages may be encrypted using TLS, SRTP, and/or the like. In some embodiments, another encapsulation protocol, such as RTSP, may be used to convey SDP messages. RTSP is an application-level protocol for controlling the delivery of data with real-time properties. RTSP provides an extensible framework to enable controlled, on-demand delivery of real-time data, such as audio and video. An RTSP client and server negotiate an appropriate set of parameters for media delivery, partially using SDP syntax to describe those parameters.

SDP is used to set up a call and create a session, such as a real-time text, voice, or video call. The purpose of SDP is to convey information about media streams in multimedia sessions to allow the recipients of a session description to participate in the session. SDP provides a means to communicate the existence of a session, and a means to convey sufficient information to enable joining and participating in the session. Media streams can be many-to-many, and sessions need not be continually active. An SDP session description includes the following: session name and purpose; time(s) the session is active; the media comprising the session; and information needed to receive those media (e.g., addresses, ports, formats, etc.). The session description may also include information about the bandwidth to be used by the session, and contact information for the person responsible for the session.

During the creation of the session, two endpoints (e.g., UE 701a and UE 701b) that are supposed to later on exchange media packets, send each other SDP offer messages and answer messages so that the two endpoints exchange respective capability information. For example, a sender (e.g., UE 701a) may want to understand what kind of decoders the receiver (e.g., UE 701b) can support, what kind of codecs the receiver can support, and so forth. The sender and the receiver need to agree on the parameters to be used during the session, such as the codecs, protocols, payload formats, and other like parameters related to the delivery of content. And on top of it our proposal here is to. According to various embodiments, various radio capabilities of the UEs 701 may also be indicated during the SDP offer/answer exchanges.

The offer/answer exchange of session descriptions assumes the existence of a higher layer protocol (e.g., SIP), which is capable of exchanging SDP for the purposes of session establishment between agents. SDP protocol operation begins when one agent (e.g., UE 701a) sends an initial offer to another agent (e.g., UE 701b). An agent is the protocol implementation involved in the offer/answer exchange, and there are at least two agents involved in an offer/answer exchange. An offer is an SDP message sent by an offerer, and an offerer is an agent that generates a session description in order to create or modify a session. An offer is an initial offer if it is outside of any context that may have already been established through the higher layer protocol. It is assumed that the higher layer protocol provides maintenance of some kind of context which allows the various SDP exchanges to be associated together.

The agent receiving the offer may generate an answer, or the agent may reject the offer. An answer is an SDP message sent by an answerer in response to an offer, and an answerer is an agent which receives a session description from another agent describing aspects of desired media communication, and then responds to that with its own session description. The means for rejecting an offer are dependent on the higher layer protocol. The offer/answer exchange is atomic in that if the answer is rejected, the session reverts to the state prior to the offer, which may be absence of a session. At any time, either agent may generate a new offer that updates the session. However, the agents may not generate a new offer if it has received an offer to which it has not yet answered or rejected. Furthermore, an agent may not generate a new offer if the agent has generated a prior offer for which it has not yet received an answer or a rejection. If an agent receives an offer after having sent one, but before receiving an answer to it, this is considered a glare condition. The term "glare" was originally used in circuit switched telecommunications networks to describe the condition where two switches both attempt to seize the same available circuit on the same trunk at the same time. For purposes of the present disclosure, "glare" may mean that both agents have attempted to send an updated offer at the same time.

For example, an originating UE 701*a* may generate and send an SIP INVITE request to be delivered to a terminating UE 701*b*. The INVITE request message may include an SDP offer, at least one media description, and one or more radio capabilities of the UE 701*a*. The SDP offer may reflect the capabilities and user preferences of the UE 701*a* for the session. In this example, after the INVITE message is conveyed to the terminating UE 701*b*, a response message including response code 180 may be conveyed to the originating UE 701*b*. The response code 180 may indicate that the destination user agent (e.g., terminating UE 701*b*) received the INVITE, and is alerting the user of the terminating UE 701*b* of the call/session. While the call/session is in a ringing state, early media may be conveyed between the two UEs 701 using a suitable mechanism, such encoding media data in RTP packets and conveying those RTP packets according to RTP. Response messages may be sent by a user agent server indicating a result of a received request. Several classes of responses are recognized, determined by the numerical range of result codes. For example, the 200 response code may indicate a successful completion of the request and/or may indicate that a call/session has been established in response to the INVITE message. The SIP and/or SDP messages may include or indicate other information than that described previously such as, for example, user location which is a determination of the end system to be used for communication, and user availability: determination of the willingness of the called party to engage in communications.

An SDP session description itself is entirely textual, and includes a number of lines of text in the form of <type>=<value>. In general, <value> is either a number of fields delimited by a single space character or a free format string, and is case-significant unless a specific field defines otherwise. An SDP session description comprises a session level section followed by zero or more media level sections. The session level part starts with a "v=" line and continues to the first media level section. Each media-level section starts with an "m=" line and continues to the next media-level section or end of the whole session description. Generally, session level values are the default for all media unless overridden by an equivalent media-level value. Example SDP session description parameters are shown by table 7-1.

TABLE 7-1

SDP Session Descriptions
Session level description

| | |
|---|---|
| v=(protocol version) | Specifies the version of Session Description Protocol |
| o=<username><sess-id><sess-version><nettype><addrtype><unicast-address> | Details about the originator and identification of the session. <username> - user login. <sess-id> - numeric string used as unique identifier for the session <sess-version> - numeric string used as version number for this session description <nettype> - Text string, specifying the network type, e.g., IN for internet <addrtype> - Text string specifying the type of the address of originator E.g.IP4 or IP6 <unicast-address> - The address of the machine from where the session is originating, which can be both FQDN or IP address. |
| s=<session name> | Only one session name per session description can be specified. It must not be empty; therefore if no name is assigned to the session, a single empty space should be used as session name |
| i=< Session information> | Only one session-level "i" field can be specified in the Session description. The "i" filed can be used in session or media description. It is primarily intended for labeling media streams when used in media description section. It can be a human readable description |
| u=<URI> | The URI (Uniform Resource Identifier) specified in the "u" filed, is a pointer to additional information about the session |
| e=<email address> | Email address of person responsible for conference or session |
| p=<phone number> | Specifies contact information for the person responsible for the conference or session |
| c=<connection information>; c=<nettype> <addrtype> <connection-address> | Connection information can be included in Session description or in media description. A session description MUST contain either at least one "c=" field in each media description or a single "c=" field at the session level. <nettype> A text string describing the network type, e.g., IN for internet. |

TABLE 7-1-continued

SDP Session Descriptions
Session level description

| | |
|---|---|
| | <addrtype> A text string describing the type of the address used in connection-address; E.g., IP4 or IP6.<br><connection-address> A Multicast IP address is specified including TTL, e.g., 224.2.36.42/127 |
| b=<bwtype>:<bandwidth> | Bandwidth field can be used both in the session description, specifying the total bandwidth of the whole session and can also be used in media description, per media session.<br><bwtype> Bandwidth type can be CT; conference total upper limit of bandwidth to be used, or AS; application specific, therefore it will be the application's concept of maximum bandwidth.<br><bandwidth> is interpreted as kilobits per second by default. |
| z=<adjustment time> <offset> <adjustment time> <offset> | To schedule a repeated session that specifies a change from daylight saving time to standard time or vice versa, it is necessary to specify difference from the originating time |
| k=<method>:<encryption key> | If channel is secure and trusted, SDP can be used to convey encryption keys. A key can be specified for the whole session or for each media description. |
| a=<attribute>:<value> | Zero or more session attribute lines. Attributes may be defined at "session-level" or at "media-level" or both. Session level attributes are used to advertise additional information that applies to conference as a whole. Media level attributes are specific to the media, i.e. advertising information about the media stream |

Time description

| | |
|---|---|
| t=<start-time>:<value> | Specifies the start and stop times for a session. If a session is active at irregular intervals, multiple time entries can be used |
| i=<repeat interval> <active duration> <offsets from start-time> | Zero or more repeat times; If a session is to be repeated at fixed intervals, the "r" field is used. By default all values should be specified in seconds, but to make description more compact, time can also be given in different units, such as days, hours or minutes; e.g., r = 6 d 2 h 14 m |

Media description

| | |
|---|---|
| m=<media> <port>/<number of ports> <proto> <fmt> | Media name and transport address. This field is used in the media description section to advertise properties of the media stream, such as the port it will be using for transmitting, the protocol used for streaming and the format or codec.<br><media> Used to specify media type, generally this can be audio, video, text etc.<br><port> The port to which the media stream will be sent. Multiple ports can also be specified if more than 1 port is being used.<br><proto> The transport protocol used for streaming, e.g., RTP (real time protocol).<br><fmt> The format of the media being sent, e.g., in which codec is the media encoded; e.g., PCMU, GSM etc. |
| i=<media title> | media title or information field |
| c=<connection information> | connection information - optional if included at session level |
| b=<bwtype>:<bandwidth> | bandwidth information |
| k=<method>:<encryption key> | encryption key |
| a=<attribute>:<value> | zero or more media attribute lines |

The RAN nodes 711 may be configured to communicate with one another via interface 712. In embodiments where the system 700 is an LTE system (e.g., when CN 720 is an EPC XR120 as in Figure XR1), the interface 712 may be an X2 interface 712. The X2 interface may be defined between two or more RAN nodes 711 (e.g., two or more eNBs and the like) that connect to EPC 720, and/or between two eNBs connecting to EPC 720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 701 from an SeNB for user data; information of PDCP PDUs that were not delivered to a UE 701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality. In embodiments where the system 700 is an MF system (e.g., when CN 720 is an NHCN 720), the interface 712 may be an X2 interface 712. The X2 interface may be defined between two or more RAN nodes 711 (e.g., two or more MF-APs and the like) that connect to NHCN 720, and/or between two MF-APs connecting to NHCN 720. In these embodiments, the X2 interface may operate in a same or similar manner as discussed previously.

In embodiments where the system 700 is a 5G or NR system (e.g., when CN 720 is an 5GC XR220 as in Figure XR2), the interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network—in this embodiment, CN 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the EPC 720.

In embodiments, the CN 720 may be a 5GC (referred to as "5GC 720" or the like), and the RAN 710 may be connected with the CN 720 via an NG interface 713. In embodiments, the NG interface 713 may be split into two parts, an NG user plane (NG-U) interface 714, which carries traffic data between the RAN nodes 711 and a UPF, and the S1 control plane (NG-C) interface 715, which is a signaling interface between the RAN nodes 711 and AMFs. Embodiments where the CN 720 is a 5GC 720 are discussed in more detail with regard to Figure XR2.

In embodiments, the CN 720 may be a 5G CN (referred to as "5GC 720" or the like), while in other embodiments, the CN 720 may be an EPC). Where CN 720 is an EPC (referred to as "EPC 720" or the like), the RAN 710 may be connected with the CN 720 via an S1 interface 713. In embodiments, the S1 interface 713 may be split into two parts, an S1 user plane (S1-U) interface 714, which carries traffic data between the RAN nodes 711 and the S-GW, and the S1-MME interface 715, which is a signaling interface between the RAN nodes 711 and MMEs.

In embodiments where the CN 720 is an MF NHCN 720, the one or more network elements 722 may include or operate one or more NH-MMEs, local AAA proxies, NH-GWs, and/or other like MF NHCN elements. The NH-MME provides similar functionality as an MME in EPC 720. A local AAA proxy is an AAA proxy that is part of an NHN that provides AAA functionalities required for interworking with PSP AAA and 3GPP AAAs. A PSP AAA is an AAA server (or pool of servers) using non-USIM credentials that is associated with a PSP, and may be either internal or external to the NHN, and the 3GPP AAA is discussed in more detail in 3GPP TS 23.402. The NH-GW provides similar functionality as a combined 5-GW/P-GW for non-EPC routed PDN connections. For EPC Routed PDN connections, the NHN-GW provides similar functionality as the S-GW discussed previously in interactions with the MF-APs over the S1 interface 713 and is similar to the TWAG in interactions with the PLMN PDN-GWs over the S2a interface. In some embodiments, the MF APs 711 may connect with the EPC 720 discussed previously. Additionally, the RAN 710 (referred to as an "MF RAN 710" or the like) may be connected with the NHCN 720 via an S1 interface 713. In these embodiments, the S1 interface 713 may be split into two parts, the S1-U interface 714 that carries traffic data between the RAN nodes 711 (e.g., the "MF-APs 711") and the NH-GW, and the S1-MME-N interface 715, which is a signaling interface between the RAN nodes 711 and NH-MMEs. The S1-U interface 714 and the S1-MME-N interface 715 have the same or similar functionality as the S1-U interface 714 and the S1-MME interface 715 of the EPC 720 discussed herein.

Figure 8:
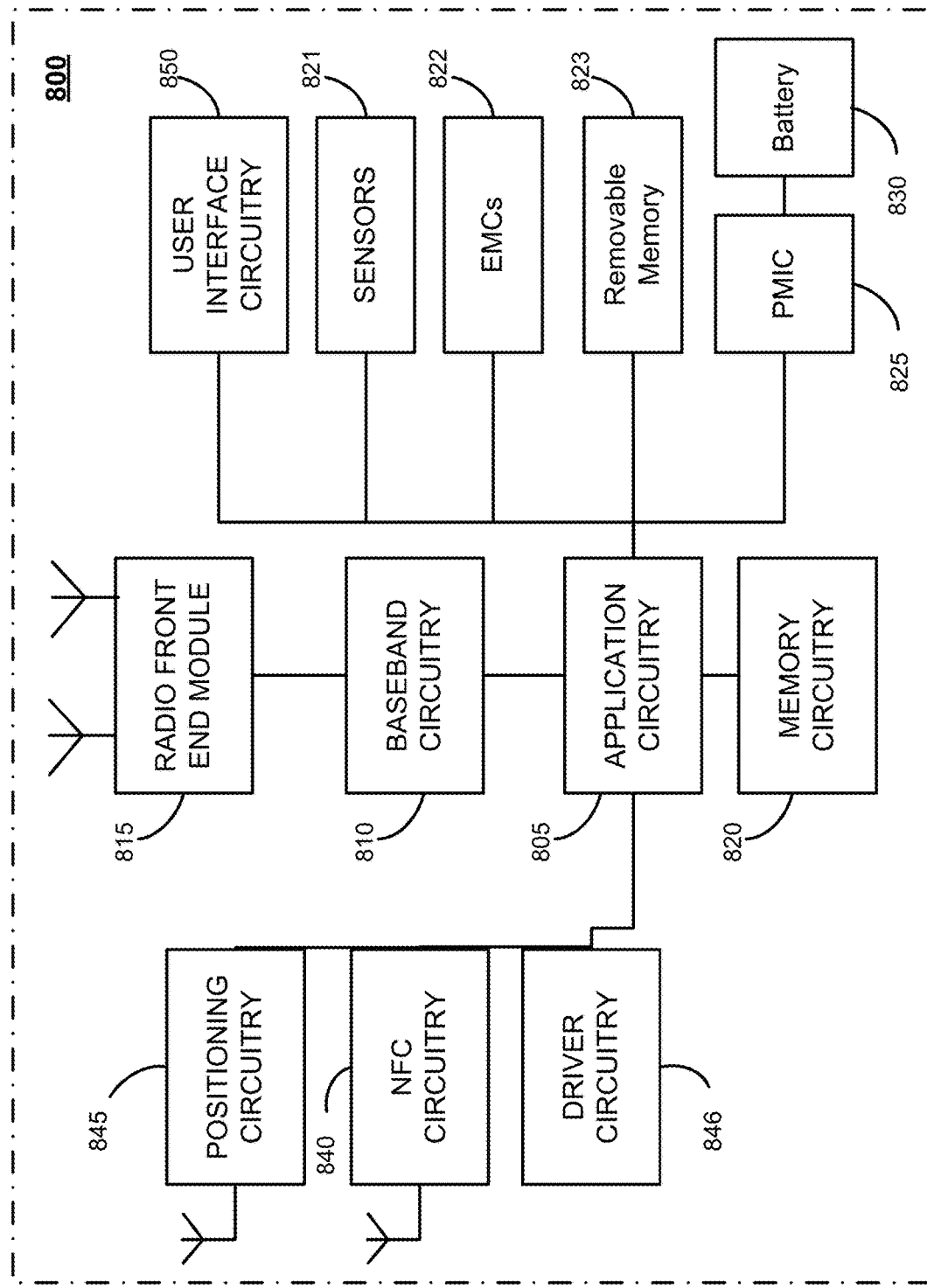
FIG. 8 depicts example components of a computer platform or device in accordance with various embodiments.

FIG. 8 illustrates an example of a platform 800 (or "device 800") in accordance with various embodiments. In embodiments, the computer platform 800 may be suitable for use as UEs 701*a-b*, application servers 730, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 805 may comprise, or may be, a special-purpose processor/controller to operate according to the various embodiments herein.

As examples, the processor(s) of application circuitry 805 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to Figure XT.

The RFEMs 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of Figure XT infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include any number and type of memory devices used to provide for a given amount of system memory. As examples, the memory circuitry 820 may include one or more of volatile memory including random access memory (RAM), dynamic RAM (DRAM)

and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 820 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

The sensor circuitry 821 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 822 include devices, modules, or subsystems whose purpose is to enable platform 800 to change its state, position, and/or orientation, or move or control a mechanism or (sub)system. Additionally, EMCs 822 may be configured to generate and send messages/signalling to other components of the platform 800 to indicate a current state of the EMCs 822. Examples of the EMCs 822 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 822 based on one or more captured events and/or instructions or control signals received from a service provider and/or various clients.

In some implementations, the interface circuitry may connect the platform 800 with positioning circuitry 845. The positioning circuitry 845 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-PNT IC that uses a master timing clock to perform position tracking/estimation without GNSS assistance. The positioning circuitry 845 may also be part of, or interact with, the baseband circuitry 810 and/or RFEMs 815 to communicate with the nodes and components of the positioning network. The positioning circuitry 845 may also provide position data and/or time data to the application circuitry 805, which may use the data to synchronize operations with various infrastructure (e.g., radio base stations), for turn-by-turn navigation applications, or the like In some implementations, the interface circuitry may connect the platform 800 with Near-Field Communication (NFC) circuitry 840. NFC circuitry 840 is configured to provide contactless, short-range communications based on radio frequency identification (RFID) standards, wherein magnetic field induction is used to enable communication between NFC circuitry 840 and NFC-enabled devices external to the platform 800 (e.g., an "NFC touchpoint"). NFC circuitry 840 comprises an NFC controller coupled with an antenna element and a processor coupled with the NFC controller. The NFC controller may be a chip/IC providing NFC functionalities to the NFC circuitry 840 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 840, or initiate data transfer between the NFC circuitry 840 and another active NFC device (e.g., a smartphone or an NFC-enabled POS terminal) that is proximate to the platform 800.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensor circuitry 821 and control and allow access to sensor circuitry 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE 701.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block XS30 may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology such as ISA, EISA, I2C, SPI, point-to-point interfaces, PMBus, PCI) PCIe, Intel® UPI, IAL, CAPI, Intel® QPI, UPI, Intel® OPA IX, RapidIO™ system IXs, CCIA, Gen-Z Consortium IXs, OpenCAPI IX, a HyperTransport interconnect, Time-Trigger Protocol (TTP) system, a FlexRay system, and/or any number of other IX technologies. The IX technology may be a proprietary bus, for example, used in an SoC based system, among others.

According to various embodiments, the various components of the system 800 may implement an MTSI client in terminal using 3GPP access. The MTSI client in terminal may include speech decoder and/or encoder circuitry, video decoder and/or encoder circuitry, text decoder and/or encoder circuitry, session setup and control circuitry, and a packet-based network interface. The packet-based network interface handles the transport of media, which includes the encapsulation of the coded media in a transport protocol as well as handling of coded media received from the network. The packet-based network interface interfaces with 3GPP L2 for the transport of media and control data. The various decoder and/or encoder circuitries interface with the user interface circuitry 850 to obtain media data to be encoded for transmission, and to provide decoded media data to the user interface circuitry 850 to be output. The various decoder and/or encoder circuitries interface with the packet-based network interface to obtain respective encoded media data to be decoded. General control-related elements of an MTSI client for conversational media, such as SIP signaling, are handled by the session setup handling and session control circuitry. These control-related elements include, for example, usage of SDP (see e.g., RFC 4566) and SDPCap-Neg in SIP invitations for capability negotiation and media stream setup, set-up and control of the individual media streams between clients, and interactivity such as adding and dropping of media components.

Various combinations of the components of the system 800 may implement the elements of the MTSI client in terminal. In one example, all of the MTSI client in terminal elements may be implemented in the baseband circuitry 810. In a second example, the application circuitry 805 may implement the speech decoder and/or encoder circuitry, video decoder and/or encoder circuitry, text decoder and/or encoder circuitry, and the session setup and control circuitry; and the packet-based network interface may be implemented by the baseband circuitry 810.

The Multimedia Telephony Service for IMS supports simultaneous transfer of multiple media components with real-time characteristics. Media components denote the actual components that the end-user experiences. Multiple media components (including media components of the same media type) may be present in a session, where at least one of these components is present in all conversational multimedia telephony sessions. All media components can be added or dropped during an ongoing session as required either by the end-user or by controlling nodes in the network, assuming that when adding components, the capabilities of the MTSI client support the additional component. The media components may include core media components including, for example, speech (e.g., the sound that is picked up by a microphone of a first terminal (e.g., UE 701a), transferred from the first terminal to a second terminal (e.g., UE 701b), and played out in an earphone/loudspeaker of the second terminal; speech includes detection, transport and generation of DTMF events), video (e.g., moving image(s) captured by a camera of a first terminal (e.g., UE 701a), transmitted to a second terminal (e.g., UE 701b), and rendered on a display of the second terminal), and text (e.g., characters typed on a keyboard or drawn on a screen on a first terminal (e.g., UE 701a) and rendered in real time on the display of a second terminal (e.g., UE 701b); the flow is time-sampled so that no specific action is needed from the user to request transmission). For the purposes of the present disclosure, the terms "voice," "speech," and "audio" may be synonymous and used interchangeably. The aforementioned media components may be transported in real time over RTP with each respective payload format mapped onto one or more RTP streams (see e.g., IETF RFC 3550). Other media types than those mentioned previously may be included in a session, for example, facsimile (fax) transmission data and non-conversational media such as IMS messaging (see e.g., 3GPP TS 24.247).

The MTSI client specifies various media codecs for individual media components. A "codec" refers to program code or process/procedure for encoding or decoding a digital data stream or signal. Examples of the codecs that may be used include AMR (see e.g., 3GPP TS 26.071) including AMR-NB, AMR-WB, and EVS AMR-WB IO (i.e., AMR-WB IO included in the EVS codec); EVS; DSR Extended Advanced Front-end codec; DTMF codecs; H.224; H.281; H.263; H.264 (MPEG-4/AVC); H.265 (HEVC); H.324 and/or 3G-324M; EVRC including EVRC-WB; G.729-based codecs including CS-ACELP codecs, the G.729.1 Audio Codec; ITU-T Recommendation T.140 codecs (including presentation control functions from ISO 6429); and/or other like codecs.

In various embodiments, the application circuitry 805 and/or the baseband circuitry 810 may implement JBM circuitry. JBM denotes the actual buffer as well as any control, adaptation and media processing algorithm (excluding speech decoder) used in the management of the jitter induced in a transport channel In some implementations, the JBM circuitry of an MTSI client with an adaptive jitter buffer may include a jitter buffer, network analyzer, adaption control logic, a decoder, and an adaptation unit. The network analyzer and the adaptation control logic, together with the information on buffer status form the actual buffer, control the JBM functionality, whereas the decoder and the adaptation unit provide the media processing functionality.

In these implementations, the jitter buffer is configured to unpack incoming RTP payloads and to store received media frames (e.g., speech or video). The buffer status may be used as input to the adaptation control logic. Furthermore, the buffer is also linked to the decoder to provide frames for decoding when requested for decoding by the decoder. The decoder may be the same or similar to the decoder circuitry mentioned previously. For example, the decoder may be a speech decoder implementing standard AMR, AMR-WB, and/or EVS speech codecs. In some implementations, the decoder may include error concealment and/or bad frame handling functionality. The decoder may be used with or without the adaptation unit. The network analyzer is configured to monitor the incoming packet stream and to collect reception statistics (e.g., jitter, packet loss) that are needed for jitter buffer adaptation. In implementations where RTCP is used, the network analyzer is also configured to maintain statistics required by the RTCP.

The adaptation control logic (also referred to as "buffer control logic") is configured to adjust playback delay, and the operation of the adaptation functionality makes decisions on the buffering delay adjustments and required media adaptation actions based on the buffer status (e.g., average buffering delay, buffer occupancy, etc.) and input from the network analyzer. External control input, including RTCP inputs/statistics from the sender, can be used, for example, to enable inter-media synchronization, to adapt the jitter buffer, and/or other external scaling requests. In these cases, the adaptation control logic provides scaling requests and scaling window information to the adaptation unit. The adaptation control logic may utilize different adaptation strategies such as fixed jitter buffer (without adaptation and time scaling), simple adaptation during comfort noise periods or buffer adaptation also during active speech. The general operation is controlled with desired proportion of frames arriving late, adaptation strategy and adaptation rate.

The adaptation unit is configured to shorten or extend the output signal length according to requests given by the adaptation control logic to enable buffer delay adjustment in a transparent manner. The adaptation is performed using the frame based or sample based time scaling on the decoder output signal during comfort noise periods only or during active speech and comfort noise. The buffer control logic may have a mechanism to limit the maximum scaling ratio. Providing a scaling window in which the targeted time scale modifications are performed improves the situation in certain scenarios (e.g., when reacting to the clock drift or to a request of inter-media (re)synchronization) by allowing flexibility in allocating the scaling request on several frames and performing the scaling on a content-aware manner. The adaptation unit may be implemented either in a separate entity from the decoder or embedded within the decoder.

Speech JBM used in MTSI may support source-controlled rate operation as well as non-source-controlled rate operation; is capable to receive the de-packetized frames out of order and present them in order for decoder consumption; is capable to receive duplicate speech frames and only present unique speech frames for decoder consumption; and is capable of handling clock drift between the encoding and decoding end-points. JBM may also be used for video frames/data wherein the overall design of the buffer may aim to minimize delay, maintain synchronization with speech, and minimize dropping of late packets. In some implementations, JBM for text may not be needed, but may still be used according to section 5 of RFC 4103 where a calculation is described for the time allowed before an extra delayed text packet may be regarded to be lost.

Figure 9:
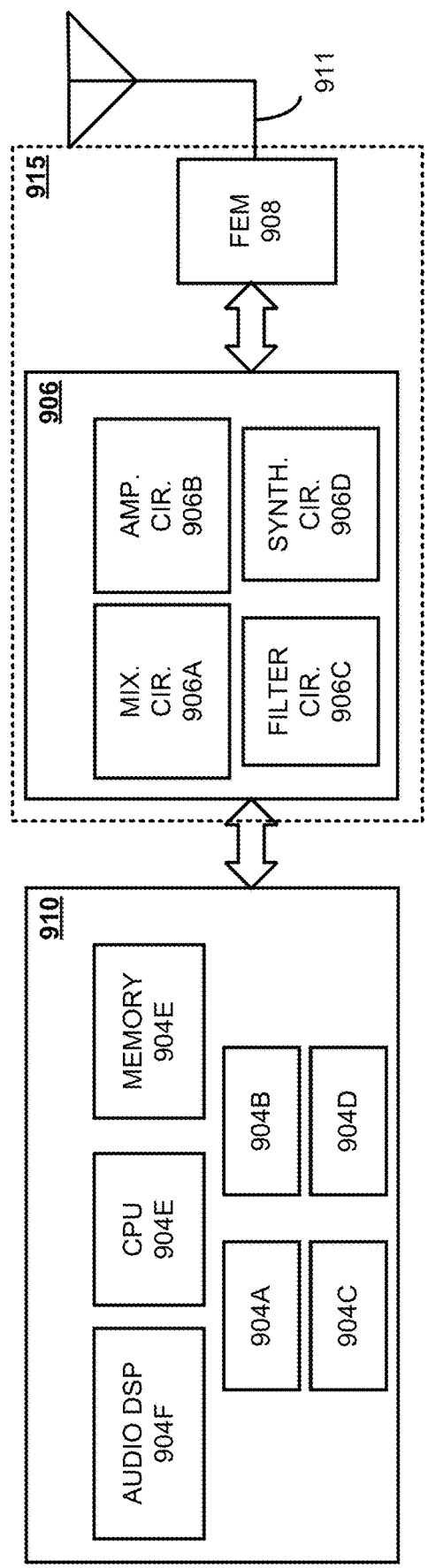
FIG. 9 depicts example components of baseband circuitry and radio frequency end modules in accordance with various embodiments.

FIG. 9 illustrates example components of baseband circuitry 910 and radio front end modules (RFEM) 915 in accordance with various embodiments. The baseband circuitry 910 corresponds to the baseband circuitry 810 of FIG. 8. The RFEM 915 corresponds to the RFEM 815 of FIG. 8. As shown, the RFEMs 915 may include Radio Frequency (RF) circuitry 906, front-end module (FEM) circuitry 908, antenna array 911 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 805 (see FIG. 8) for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., sixth generation (6G), etc.). In other embodiments, some or all of the functionality of baseband processors 904A-D may be included in modules stored in the memory 904G and executed via a Central Processing Unit (CPU) 904E. In other embodiments, some or all of the functionality of baseband processors 904A-D may be provided as hardware accelerators (e.g., FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio digital signal processor(s) (DSP) 904F. The audio DSP(s) 904F include elements for compression/decompression and echo cancellation and may include other suitable processing elements in other embodiments.

In some embodiments, each of the processors 904A-904E include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 805 of FIG. 8; an RF circuitry interface to send/receive data to/from RF circuitry 906 of FIG. 9; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 825.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by Figure XT, in some embodiments, the baseband circuitry 910 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and logical link control (LLC) functions. The protocol processing circuitry may include one or more memory structures (e.g., 904G) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry 805 may be implemented together as individual SoCs mounted to a same circuit board (e.g., a "multi-chip package").

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 910 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a of the transmit signal path may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 910 or the application circuitry 805 depending on the desired output frequency. In some embodiments, a divider control input (e.g., N) may be determined from a look-up table based on a channel indicated by the application circuitry 805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 911. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 911.

The antenna array 911 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 911 including one or more antenna elements (not shown). The antenna elements may be omnidirectional, direction, or a combination thereof. The antenna elements may be formed in a multitude of arranges as are known and/or discussed herein. The antenna array 911 may comprise microstrip antennas or printed antennas that are fabricated on the surface of one or more printed circuit boards. The antenna array 911 may be formed in as a patch of metal foil (e.g., a patch antenna) in a variety of shapes, and may be coupled with the RF circuitry 906 and/or FEM circuitry 908 using metal transmission lines or the like.

Processors of the application circuitry 805 and processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of the application circuitry 805 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 10:
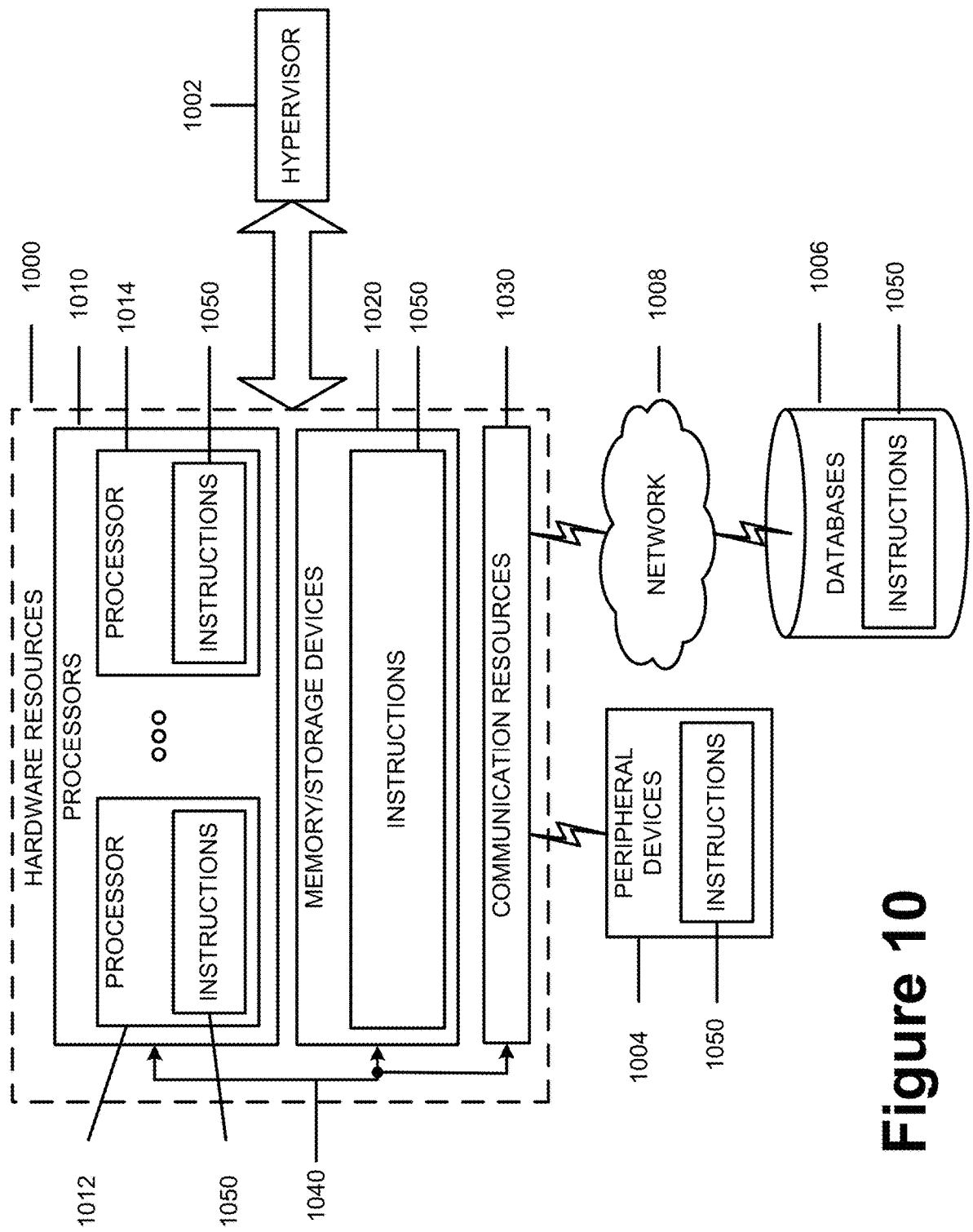
FIG. 10 is a block diagram illustrating components, according to some example embodiments, able to read instructions from a machine-readable or computer-readable medium (for example, a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Some non-limiting Examples of various embodiments are provided below.

Example 1 is one or more non-transitory, computer-readable media (NTCRM) having instructions, stored thereon, that when executed by one or more processors of a first UE, cause the first UE to: encode, for transmission to a second UE that is to capture point cloud video, a real-time transport control protocol (RTCP) feedback message that includes viewport information to indicate a region of interest, wherein the viewport information includes an indication of a reference point for the region of interest; and receiving, from the second UE, the point cloud video for the region of interest based on the viewport information.

Example 2 is the one or more NTCRM of Example 1, wherein the reference point corresponds to a center of a sphere and the viewport information indicates the region of interest as a portion of the sphere with respect to the reference point.

Example 3 is the one or more NTCRM of Example 2, wherein the viewport information includes a yaw value, a pitch value, and a width value to indicate the region of interest with respect to the reference point.

Example 4 is the one or more NTCRM of Example 2, wherein the viewport information includes an elevation value, an azimuth value, and a tilt value to indicate the region of interest with respect to the reference point.

Example 5 is the one or more NTCRM of Example 1, wherein the indication of the reference value includes an x-axis value to indicate a location of the reference point on an x-axis, a y-axis value to indicate a location of the reference point on a y-axis, and a z-axis value to indicate a location of the reference point on a z-axis, wherein the x-axis, y-axis, and z-axis are orthogonal to one another.

Example 6 is the one or more NTCRM of Example 1, wherein the viewport information indicates the region of interest from among a plurality of a predefined regions of interest.

Example 7 is the one or more NTCRM of Example 1, wherein the instructions, when executed, are further to cause the first UE to negotiate one or more parameters of the viewport information with the second UE via session description protocol (SDP).

Example 8 is the one or more NTCRM of Example 8, wherein, as part of the negotiation, the first UE is to indicate in an SDP message whether the first UE supports an arbitrary region of interest mode in which the first UE indicates the region of interest as a specific location anywhere within a content region associated with the point cloud video or a pre-defined region of interest mode in which the first UE indicates the region of interest as one of a pre-defined set of regions of interest.

Example 9 is the one or more NTCRM of Example 8, wherein the one or more parameters that are negotiated further include the pre-defined set of regions of interest.

Example 10 is one or more non-transitory, computer-readable media (NTCRM) having instructions, stored thereon, that when executed by one or more processors of a first UE, cause the first UE to: receive, from a second UE, a real-time transport control protocol (RTCP) feedback message that includes viewport information to indicate a region of interest associated with point cloud video content, wherein the viewport information includes an indication of a reference point for the region of interest; and encoding, for transmission to the second UE, the point cloud video for the region of interest based on the viewport information.

Example 11 is the one or more NTCRM of Example 10, wherein the reference point corresponds to a center of a sphere and the viewport information indicates the region of interest as a portion of the sphere with respect to the reference point.

Example 12 is the one or more NTCRM of Example 11, wherein the viewport information includes a yaw value, a pitch value, and a width value to indicate the region of interest with respect to the reference point.

Example 13 is the one or more NTCRM of Example 11, wherein the viewport information includes an elevation value, an azimuth value, and a tilt value to indicate the region of interest with respect to the reference point.

Example 14 is the one or more NTCRM of Example 10, wherein the indication of the reference value includes an x-axis value to indicate a location of the reference point on an x-axis, a y-axis value to indicate a location of the reference point on a y-axis, and a z-axis value to indicate a location of the reference point on a z-axis, wherein the x-axis, y-axis, and z-axis are orthogonal to one another.

Example 15 is the one or more NTCRM of Example 10, wherein the viewport information indicates the region of interest from among a plurality of a predefined regions of interest.

Example 16 is the one or more NTCRM of Example 10, wherein the instructions, when executed, are further to cause the first UE to negotiate one or more parameters of the viewport information with the second UE via session description protocol (SDP).

Example 17 is the one or more NTCRM of Example 16, wherein, as part of the negotiation, the second UE is to indicate in an SDP message whether the second UE supports an arbitrary region of interest mode in which the second UE indicates the region of interest as a specific location anywhere within a content region associated with the point cloud video or a pre-defined region of interest mode in which the second UE indicates the region of interest as one of a pre-defined set of regions of interest.

Example 18 is the one or more NTCRM of Example 17, wherein the one or more parameters that are negotiated further include the pre-defined set of regions of interest.

Example 19 is an apparatus to be implemented in a first user equipment (UE), the apparatus comprising: a multimedia telephony services over Internet Protocol multimedia subsystem (MTSI) client to: encode, for transmission to a second UE that is to capture point cloud video, a real-time transport control protocol (RTCP) feedback message that includes viewport information to indicate a region of interest, wherein the viewport information includes an indication of a reference point for the region of interest; and receive, from the second UE, the point cloud video for the region of interest based on the viewport information. The apparatus further comprises processor circuitry to render the received point cloud video.

Example 20 is the apparatus of Example 19, wherein the reference point corresponds to a center of a sphere and the viewport information indicates the region of interest as a portion of the sphere with respect to the reference point.

Example 21 is the apparatus of Example 20, wherein the viewport information includes a yaw value, a pitch value, and a width value to indicate the region of interest with respect to the reference point.

Example 22 is the apparatus of Example 20, wherein the viewport information includes an elevation value, an azimuth value, and a tilt value to indicate the region of interest with respect to the reference point.

Example 23 is the apparatus of Example 19, wherein the indication of the reference value includes an x-axis value to indicate a location of the reference point on an x-axis, a y-axis value to indicate a location of the reference point on a y-axis, and a z-axis value to indicate a location of the reference point on a z-axis, wherein the x-axis, y-axis, and z-axis are orthogonal to one another.

Example 24 is the apparatus of Example 19, wherein the MTSI client is further to negotiate one or more parameters of the viewport information with the second UE via session description protocol (SDP).

Example 25 is the apparatus of Example 19, further comprising one or more antennas to transmit the RTCP feedback message.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "AMR" and "AMR-NB" refer to the AMR codec (see e.g., 3GPP TS 26.071) and are used interchangeably in this specification.

The term "codec mode" refers to use of the AMR and AMR-WB codecs to identify one specific bitrate. For example AMR includes 8 codec modes (excluding SID), each of different bitrate.

The term "constrained terminal" refers to a UE that is (i) operating in radio access capability category series "M" [162] capable of supporting conversational services, and/or (ii) a wearable device which is constrained in size, weight or power consumption (e.g., connected watches), excluding smartphones and feature phones.

The term "dual-mono" refers to a variant of 2-channel stereo encoding where two instances of a mono codec are used to encode a 2-channel stereo signal.

The term "EVS codec" refers to the EVS codec includes two operational modes: EVS Primary operational mode ('EVS Primary mode') and EVS AMR-WB Inter-Operable ('EVS AMR-WB IO mode'). When using EVS AMR-WB IO mode the speech frames are bitstream interoperable with the AMR-WB codec [18]. Frames generated by an EVS AMR-WB IO mode encoder can be decoded by an AMR-WB decoder, without the need for transcoding. Likewise, frames generated by an AMR-WB encoder can be decoded by an EVS AMR-WB IO mode decoder, without the need for transcoding.

The term "EVS Primary mode" refers to 11 bit-rates for fixed-rate or multi-rate operation; 1 average bit-rate for variable bit-rate operation; and 1 bit-rate for SID (3GPP TS 26.441). The EVS Primary can encode narrowband, wideband, super-wideband and fullband signals. None of these bit-rates are interoperable with the AMR-WB codec.

The term "EVS AMR-WB IO mode" refers to 9 codec modes and SID. All are bitstream interoperable with the AMR-WB codec (3GPP TS 26.171).

The term "Frame Loss Rate" or "FLR" refers to the percentage of speech frames not delivered to the decoder. FLR includes speech frames that are not received in time to be used for decoding.

The term "mode-set" refers to use of the AMR and AMR-WB codecs to identify the codec modes that can be used in a session. A mode-set can include one or more codec modes.

The term "MSMTSI client" refers to a multi-stream capable MTSI client supporting multiple streams. An MTSI client may support multiple streams, even of the same media type, without being an MSMTSI client. Such an MTSI client may, for example, add a second video to an ongoing video telephony session as shown and described by Annex A.11 of 3GPP TS 26.114 v16.2.0 (2019-06).

The term "MTSI client" refers to a function in a terminal or in a network entity (e.g., a MRFP) that supports MTSI. The term "MTSI client in terminal" refers to an MTSI client that is implemented in a terminal or UE. The term "MTSI client in terminal" is used in this document when entities such as MRFP, MRFC, or media gateways are excluded. The term "MTSI media gateway" or "MTSI MGW" refers to a media gateway that provides interworking between an MTSI client and a non MTSI client, e.g., a CS UE. The term MTSI media gateway may be implemented in an MGW or in an MGCF. The term "MSMTSI MRF" refers to an MSMTSI client implemented by functionality included in the MRFC and the MRFP.

The term "operational mode" refers to an use of the EVS codec to distinguish between EVS Primary mode and EVS AMR-WB IO mode.

The term "simulcast" refers to simultaneously sending different encoded representations (simulcast formats) of a single media source (e.g., originating from a single microphone or camera) in different simulcast streams. The term "simulcast format" refers to an the encoded format used by a single simulcast stream, typically represented by an SDP format and all SDP attributes that apply to that particular SDP format, indicated in RTP by the RTP header payload type field. The term "simulcast stream" refers to an an RTP stream carrying a single simulcast format in a simulcast.

The term "viewport" refers to a viewing region, expressed in rendering-device-specific coordinates, in which graphical objects of interest are to be rendered. The viewport may have a polygon or circular/spherical shape.

The invention claimed is:

1. One or more non-transitory, computer-readable media (NTCRM) having instructions, stored thereon, that when executed by one or more processors of a first UE, cause the first UE to:
transmit, from the first UE to a second UE that is to capture point cloud video, a real-time transport control protocol (RTCP) feedback message that includes viewport information to indicate a region of interest, wherein the viewport information in the RTCP feedback message includes:
an indication of a center of a sphere, wherein the center of the sphere is a reference point for the region of interest; and
an indication of the region of interest as a portion of the sphere, wherein the indication of the region of interest is provided with respect to the reference point; and
receive, by the first UE from the second UE, the point cloud video for the region of interest based on the viewport information.

2. The one or more NTCRM of claim 1, wherein the viewport information includes a yaw value, a pitch value, and a width value to indicate the region of interest with respect to the reference point.

3. The one or more NTCRM of claim 1, wherein the viewport information includes an elevation value, an azimuth value, and a tilt value to indicate the region of interest with respect to the reference point.

4. The one or more NTCRM of claim 1, wherein the indication of the reference value includes an x-axis value to indicate a location of the reference point on an x-axis, a y-axis value to indicate a location of the reference point on a y-axis, and a z-axis value to indicate a location of the reference point on a z-axis, wherein the x-axis, y-axis, and z-axis are orthogonal to one another.

5. The one or more NTCRM of claim 1, wherein the viewport information indicates the region of interest from among a plurality of pre-defined regions of interest.

6. The one or more NTCRM of claim 1, wherein the instructions, when executed, are further to cause the first UE to negotiate one or more parameters of the viewport information with the second UE via session description procotol (SDP).

7. The one or more NTCRM of claim 6, wherein, as part of the negotiation, the first UE is to indicate in an SDP message whether: (A) the first UE supports an arbitrary region of interest mode in which the first UE indicates the region of interest as a specific location anywhere within a content region associated with the point cloud video, or (B) a pre-defined region of interest mode in which the first UE indicates the region of interest as one of a pre-defined set of regions of interest.

8. The one or more NTCRM of claim 7, wherein the one or more parameters that are negotiated further include the pre-defined set of regions of interest.

9. One or more non-transitory, computer-readable media (NTCRM) having instructions, stored thereon, that when executed by one or more processors of a first UE, cause the first UE to:
receive, by the first UE from a second UE, a real-time transport control protocol (RTCP) feedback message that includes viewport information to indicate a region of interest associated with point cloud video content, wherein the viewport information in the RTCP feedback message includes:
an indication of a point in a three-dimensional volume, wherein the point in the three-dimensional volume is a reference point for the region of interest; and
an indication of the region of interest as a portion of the three-dimensional volume, wherein the indication of the region of interest is provided with respect to the reference point; and
transmit, from the first UE to the second UE, the point cloud video for the region of interest based on the viewport information.

10. The one or more NTCRM of claim 9, wherein the three-dimensional volume is a sphere, and wherein the point within the three-dimensional volume is a center of the sphere.

11. The one or more NTCRM of claim 10, wherein the viewport information includes a yaw value, a pitch value, and a width value to indicate the region of interest with respect to the reference point.

12. The one or more NTCRM of claim 10, wherein the viewport information includes an elevation value, an azimuth value, and a tilt value to indicate the region of interest with respect to the reference point.

13. The one or more NTCRM of claim 9, wherein the indication of the reference value includes an x-axis value to indicate a location of the reference point on an x-axis, a y-axis value to indicate a location of the reference point on a y-axis, and a z-axis value to indicate a location of the reference point on a z-axis, wherein the x-axis, y-axis, and z-axis are orthogonal to one another.

14. The one or more NTCRM of claim 9, wherein the viewport information indicates the region of interest from among a plurality of pre-defined regions of interest.

15. The one or more NTCRM of claim 9, wherein the instructions, when executed, are further to cause the first UE to negotiate one or more parameters of the viewport information with the second UE via session description procotol (SDP).

16. The one or more NTCRM of claim 15, wherein, as part of the negotiation, the second UE is to indicate in an SDP message whether: (A) the second UE supports an arbitrary region of interest mode in which the second UE indicates the region of interest as a specific location anywhere within a content region associated with the point cloud video, or (B) a pre-defined region of interest mode in which the second UE indicates the region of interest as one of a pre-defined set of regions of interest.

17. The one or more NTCRM of claim 16, wherein the one or more parameters that are negotiated further include the pre-defined set of regions of interest.

18. An apparatus to be implemented in a first user equipment (UE), the apparatus comprising:
a multimedia telephony services over Internet Protocol multimedia subsystem (MTSI) client to:
transmit, from the first UE to a second UE that is to capture point cloud video, a real-time transport control protocol (RTCP) feedback message that includes viewport information to indicate a region of interest, wherein the viewport information in the RTCP feedback message includes:
an indication of a center of a sphere, wherein the center of the sphere is a reference point for the region of interest; and
an indication of the region of interest as a portion of the sphere, wherein the indication of the region of interest is provided with respect to the reference point; and
receive, by the first UE from the second UE, the point cloud video for the region of interest based on the viewport information; and
processor circuitry to render the received point cloud video.

19. The apparatus of claim 18, wherein the viewport information includes a yaw value, a pitch value, and a width value to indicate the region of interest with respect to the reference point.

20. The apparatus of claim 18, wherein the viewport information includes an elevation value, an azimuth value, and a tilt value to indicate the region of interest with respect to the reference point.

21. The apparatus of claim 18, wherein the indication of the reference value includes an x-axis value to indicate a location of the reference point on an x-axis, a y-axis value to indicate a location of the reference point on a y-axis, and a z-axis value to indicate a location of the reference point on a z-axis, wherein the x-axis, y-axis, and z-axis are orthogonal to one another.

22. The apparatus of claim 18, wherein the MTSI client is further to negotiate one or more parameters of the viewport information with the second UE via session description procotol (SDP).

23. The apparatus of claim 18, further comprising one or more antennas to transmit the RTCP feedback message.

* * * * *

UNITED STATES PATENT AND TRADEMARK OFFICE
CERTIFICATE OF CORRECTION

PATENT NO. : 12,113,843 B2
APPLICATION NO. : 16/912491
DATED : October 8, 2024
INVENTOR(S) : Ozgur Oyman It is certified that error appears in the above-identified patent and that said Letters Patent is hereby corrected as shown below:

In the Claims

Column 49:
Claim 1, Line 32, replace "UE" with "user equipment (UE)," after "processors of a first" and before "cause the"

Column 50:
Claim 9, Line 20, replace "UE" with "user equipment (UE)," after "processors of a first" and before "cause the"

Signed and Sealed this
Fifth Day of November, 2024

Katherine Kelly Vidal
*Director of the United States Patent and Trademark Office*